US011595222B2

United States Patent
Prabhakara et al.

(10) Patent No.: US 11,595,222 B2
(45) Date of Patent: Feb. 28, 2023

(54) SYSTEM AND METHOD FOR USING A MULTICAST SERVICE TO CONFIGURE A CONTROLLING DEVICE

(71) Applicant: Universal Electronics Inc.

(72) Inventors: Prasanna Moodlamakki Prabhakara, Bangalore (IN); Sarika Desai, Bangalore (IN)

(73) Assignee: Universal Electronics Inc., Scottsdale, AZ (US)

( * ) Notice: Subject to any disclaimer, the term of this patent is extended or adjusted under 35 U.S.C. 154(b) by 41 days.

(21) Appl. No.: 17/182,727

(22) Filed: Feb. 23, 2021

(65) Prior Publication Data

US 2022/0271961 A1 Aug. 25, 2022

(51) Int. Cl.
| | |
|---|---|
| *H04L 12/18* | (2006.01) |
| *H04W 8/00* | (2009.01) |
| *H04L 61/4511* | (2022.01) |
| *H04L 61/4541* | (2022.01) |
| *G16Y 10/75* | (2020.01) |
| *G16Y 40/35* | (2020.01) |

(52) U.S. Cl.
CPC ........ *H04L 12/185* (2013.01); *H04L 61/4511* (2022.05); *H04L 61/4541* (2022.05); *H04W 8/005* (2013.01); *G16Y 10/75* (2020.01); *G16Y 40/35* (2020.01)

(58) Field of Classification Search
CPC ............... H04L 12/185; H04L 61/1511; H04L 61/1541; H04W 8/005; G16Y 40/35; G16Y 10/75
See application file for complete search history.

(56) References Cited

U.S. PATENT DOCUMENTS

| | | | |
|---|---|---|---|
| 10,593,195 B2 | 3/2020 | Owrang et al. | |
| 2004/0260800 A1 | 12/2004 | Gu et al. | |
| 2006/0026455 A1 | 2/2006 | Hwang et al. | |
| 2007/0130607 A1 | 6/2007 | Thissen et al. | |
| 2018/0316655 A1 | 11/2018 | Mani et al. | |
| 2019/0043345 A1* | 2/2019 | Owrang | H04N 21/42226 |
| 2019/0296979 A1 | 9/2019 | Gupta et al. | |
| 2020/0128404 A1 | 4/2020 | Lee | |
| 2020/0191943 A1 | 6/2020 | Wu et al. | |
| 2020/0322227 A1* | 10/2020 | Janakiraman | H04L 41/12 |

FOREIGN PATENT DOCUMENTS

CN 111143892 A * 5/2020

OTHER PUBLICATIONS

ISA/US, Int. Search Report and Written Opinion issued on PCT application No. PCT/US22/17255, dated Jun. 9, 2022, 17 pages.

* cited by examiner

*Primary Examiner* — Zhensheng Zhang
(74) *Attorney, Agent, or Firm* — Greenberg Traurig, LLP

(57) ABSTRACT

A signature comprised of a plurality of data blocks formatted in accordance with a multicast communications protocol is received from a target appliance. When it is determined that one or more of the plurality of data blocks has been populated with user data, a representation of at least a portion of signature is provided to an analytics engine for processing whereby the user data within the one or more of the plurality of data blocks is replaced with a predicted, original data. The predicted, original data is then usable to provision a controlling device with a command code set for use in communicating commands to the target appliance.

20 Claims, 19 Drawing Sheets

| Function | Appliance | | | | | |
|---|---|---|---|---|---|---|
| | TV | AVR | STB/DVR | DVD | CD | Etc.... |
| Power on | CEC | CEC | CEC | CEC | IR | |
| Power off | CEC | CEC | CEC | CEC | IR | |
| Volume up | IR | CEC | n/a | n/a | n/a | |
| Volume down | IR | CEC | n/a | n/a | n/a | |
| Mute | IR | CEC | n/a | n/a | n/a | |
| Play | n/a | n/a | CEC | CEC | IR | |
| Pause | n/a | n/a | CEC | CEC | IR | |
| FF | n/a | n/a | CEC | CEC | IR | |
| Rew | n/a | n/a | CEC | CEC | IR | |
| Sound field A | CEC | IP | IP | n/a | n/a | |
| Sound field B | CEC | IP | IP | n/a | n/a | |
| Input 1 | CEC | IR | n/a | n/a | n/a | |
| Input 2 | CEC | IR | n/a | n/a | n/a | |
| Etc..... | | | | | | |

FIG. 7

SYSTEM AND METHOD FOR USING A MULTICAST SERVICE TO CONFIGURE A CONTROLLING DEVICE

BACKGROUND

Multicast services are known in the art, By way of example, the multicast domain name service (mDNS) protocol is a predominant and lightweight protocol that is used to do service announcements and/or discovery for devices, such as Internet of Things (IoT) devices. The mDNS protocol is, by definition, multicast in nature and is limited to a subnet, although there are multiple techniques for service discovery/announcing across subnets. As further described in U.S. Pat. No. 10,593,195 and US Publication No. 2018/0316655, the disclosures of which are incorporated herein by reference, when a user on-boards to an IoT network, a client application on an end device may use a multicast service to discover the services/appliances that are available on the IoT network.

SUMMARY

The following relates generally to improved methods for using a multicast service, such as the multicast domain name service (mDNS) or the like, to configure a controlling device, such as a remote control, smart phone, tablet computer, an appliance with embedded controlling functionality, etc., whereupon the controlling device will be usable to command one or more functional operations of one or more target appliances.

More particularly, the following describes a solution to the problem that manufacturer provided information in data fields obtained from an IOT device during a device discovery process, such as data that identifies a model and brand of the IOT device, has been modified by a user. To address this problem, the system/process described herein generally provides mDNS signatures, Simple Service Discovery Protocol (SSDP) signatures, and the like collected from different IoT devices to an analytics engine. The data analytics engine then builds a clustering model and clusters data based on matching features. By clustering the data, similar signatures for brands and models can be grouped together and dictionaries can be created based on the cluster output for use in correcting/editing user information in collected data blocks. For example, data from the same clusters can be analyzed and, if a collected data block has data that has been modified by a user, a process function will replace the modified information by using the most occurring original information, e.g., manufacturer provided information, from the same cluster. The corrected mDNS and SSDP signatures having the predicted brand and model data can then be provided to a configuration process for use in configuring a controlling device to control functional operations of an intended target device. The corrected signature can also be provided to a ML model to predict different attributes for any further purposes as desired. Still further, the cleaned data can be trained into the model and the dictionary for any new signature predictions.

A better understanding of the objects, advantages, features, properties and relationships of the subject system and method will be obtained from the following detailed description and accompanying drawings which set forth illustrative embodiments and which are indicative of the various ways in which the principles of the subject system and method may be employed.

BRIEF DESCRIPTION OF THE DRAWINGS

For a better understanding of the various aspects of the subject system and method reference may be had to preferred embodiments shown in the attached drawings in which:

FIG. 7 illustrates an example preferred command matrix for use in a control environment, for example as illustrated in FIG. 6;

DETAILED DESCRIPTION

Figure 1:
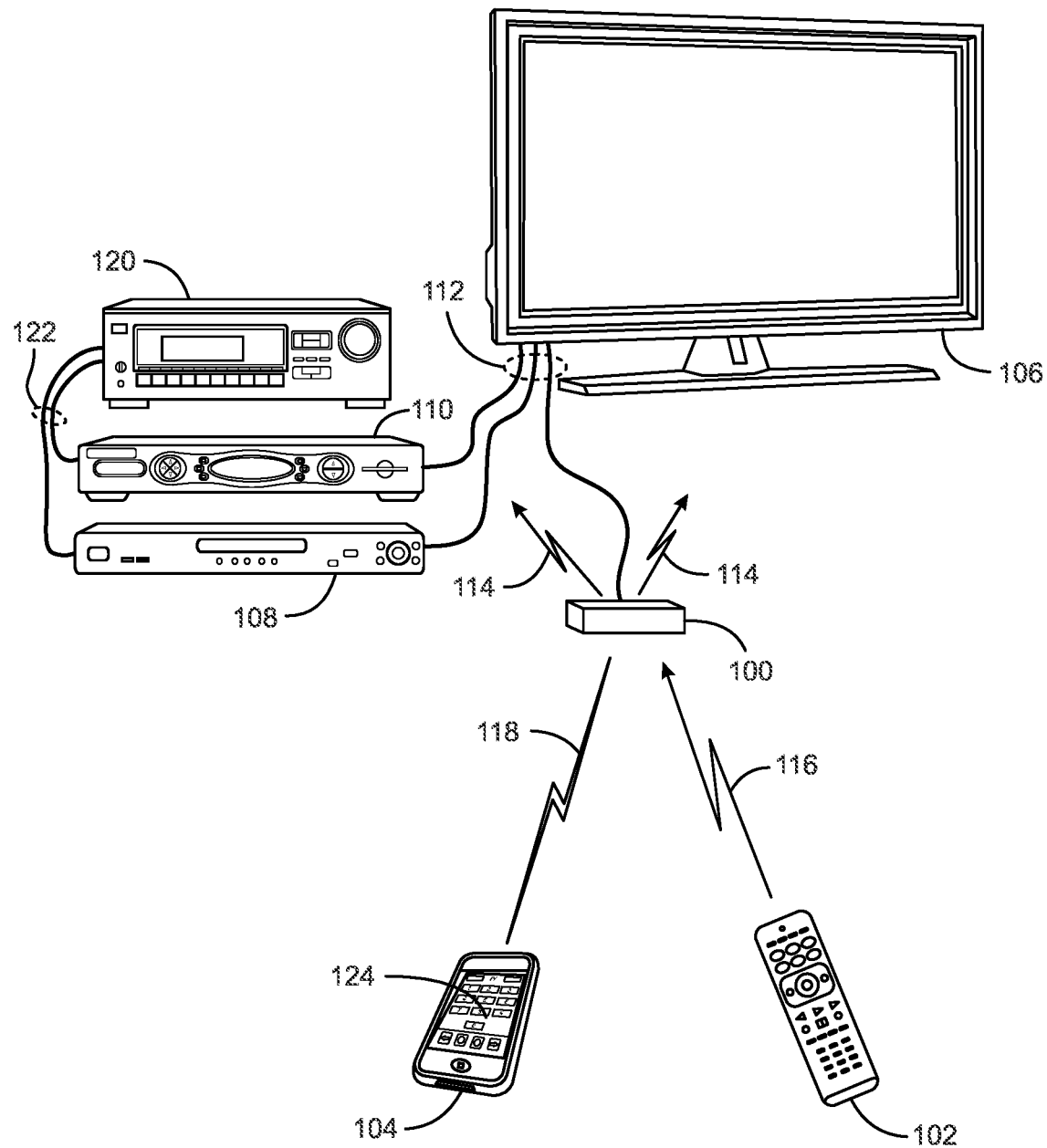
FIGS. 1 and 2 illustrate example systems in which a controlling device is used to control functionality of one or more appliances.

With reference to FIG. 1, there is illustrated an example system in which a controlling device 100 may be used to issue commands to control various controllable appliances, such as a television 106, a cable set top box combined with a digital video recorder ("STB/DVR") 110, a DVD player 108, and an AV receiver 120. While illustrated in the context of a television 106, STB/DVR 110, a DVD player 108, and an AV receiver 120, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

In the illustrative example of FIG. 1, appliance commands may be issued by controlling device 100 in response to infrared ("IR") request signals 116 received from a further remote control device 102, radio frequency ("RF") request signals 118 received from a remote control app 124 resident on a smart device 104, or any other device from which controlling device 100 may be adapted to receive requests, using any appropriate communication method. As illustrated, transmission of the requested appliance commands from the controlling device 100 to appliances 106,108,112, 120 may take the form of wireless IR signals 114, CEC commands issued over a wired HDMI interface 112, RF signals such as contemplated by RF4CE, Zwave, and Bluethooth, etc. as appropriate to the capabilities of the particular appliance to which each command may be directed. In particular, in the example system illustrated, AV receiver 120 may not support HDMI inputs, being connected to audio source appliances 108, 110 via, for example S/PDIF interfaces 122. Accordingly, controlling device 100 may be constrained to transmit all commands destined for AV receiver 120 exclusively as IR signals, while commands destined for the other appliances 106 through 110 may take the form of either CEC, RF, or IR signals as appropriate for each command. By way of example without limitation, certain TV manufacturers may elect not to support volume adjustment via CEC. If the illustrative TV 106 is of such manufacture, the controlling device 100 may relay volume adjustment requests to TV 106 as IR signals 114, while other requests such as power on/off or input selections may be relayed in the form of CEC commands over HDMI connection 112.

It will however be appreciated that while illustrated in the context of IR, RF, and wired CEC signal transmissions, in general, transmissions to and from controlling device 100 may take the form of any convenient IR, RF, hardwired, point-to-point, or networked protocol, as necessary for a particular embodiment. Further, while wireless communications 116, 118, etc., between example devices are illustrated herein as direct links, it should be appreciated that in some instances such communication may take place via a local area network or personal area network, and as such may involve various intermediary devices such as routers, bridges, access points, etc. Since these items are not necessary for an understanding of the instant invention, they are omitted from this and subsequent Figures for the sake of clarity.

Since smart device, remote control apps such as that contemplated in the illustrative device 104 are well known, for the sake of brevity the operation, features, and functions thereof will not be described in detail herein. Nevertheless, if a more complete understanding of the nature of such apps is desired, the interested reader may turn to, for example, the before mentioned U.S. patent application Ser. No. 12/406, 601 or U.S. patent application Ser. No. 13/329,940, (now U.S. Pat. No. 8,243,207) which references are incorporated herein by reference in their entirety. In some instances, a smart device, such as smart device 104, when provided with the requisite software, may itself be considered to a controlling device within the context of this application and may, accordingly, communicate commands directly with appliance via use of properly selected protocols which both the appliances and the smart device 104 support.

Figure 2:
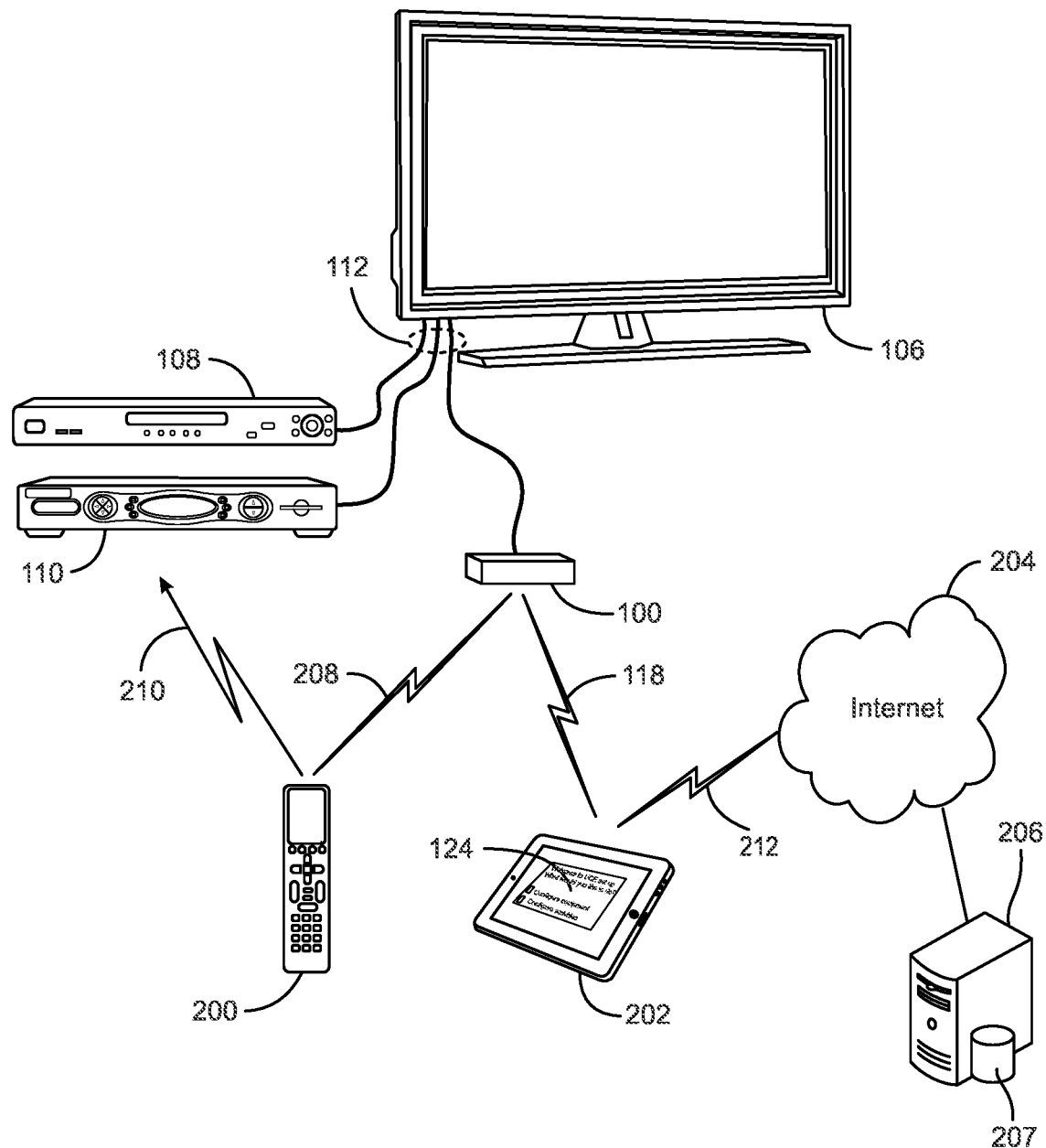

Turning now to FIG. 2, in a further illustrative embodiment, controlling device 100 may receive wireless request signals from a remote control 200 and/or a remote control app resident on a tablet computer 202. As before, command transmissions to appliances 106, 108, 110 may take the form of wired CEC commands or wireless RF or IR commands. However, in this example remote control 200 may be in bi-directional communication 208 with controlling device 100 and accordingly the controlling device 100 may delegate the transmission of certain commands, such as IR commands 210, to the remote control device 200, i.e., use remote control 200 as a relay device for those commands determined to be best executed via IR transmissions. As also generally illustrated in FIG. 2, a setup app 214 executing on a smart device, such as tablet computer 202 may be utilized in conjunction with an Internet (212, 204) accessible or cloud based server 206 and associated database 207 to initially configure controlling device 100 for operation with the specific group of appliances to be controlled, i.e., to communicate to controlling device 100 a matching command code set and capability profile for each particular appliance to be controlled, for example based on type, manufacture, model number, etc., as will be described in greater detail hereafter.

Figure 3:
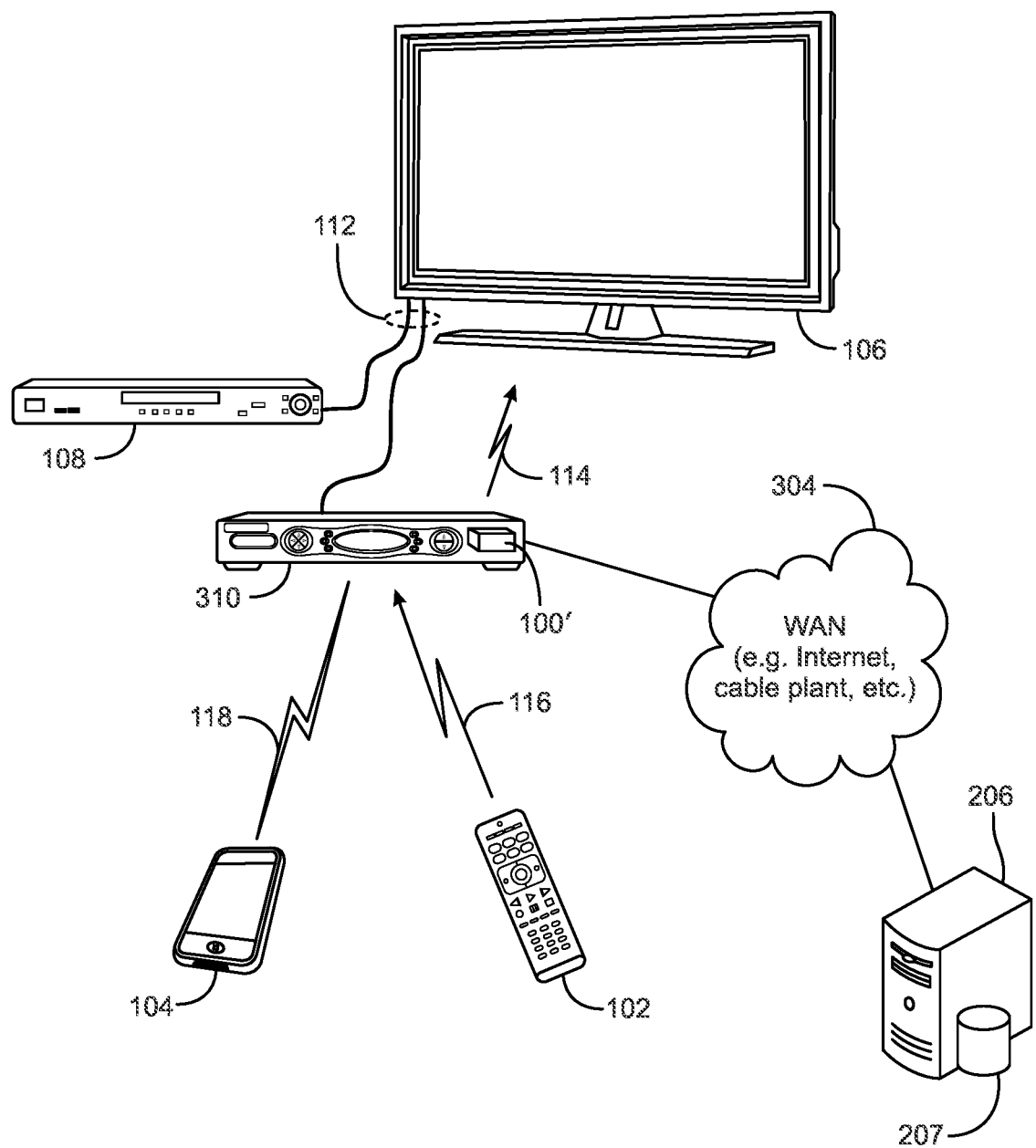
FIGS. 3 and 4 illustrate example systems in which a controlling device, in the form on an appliance which is part of a home entertainment system and which incorporates remote control functionality, is used to control functionality of one or more further appliances.

With reference to FIG. 3, in a further illustrative embodiment controlling device functionality 100' may be embedded in an appliance, for example STB/DVR 310, thus making such an appliance a controlling device in the context of this document. In this example, remote control 102 and/or smart device 104 may transmit wireless request signals directly to STB/DVR 310 for action by the built-in controlling device function 100', which actions may, as before, comprise CEC command transmissions via HDMI connection 112 or wireless RF or IR command transmissions 114, originating in this instance from an RF transmitter or IR blaster provisioned to the STB/DVR appliance 310. In this configuration, a set up application resident in STB/DVR 310 may be utilized to configure controlling device functionality 100', using for example an Internet connection 304 accessible through a cable modem and/or cable distribution system headend.

Figure 4:
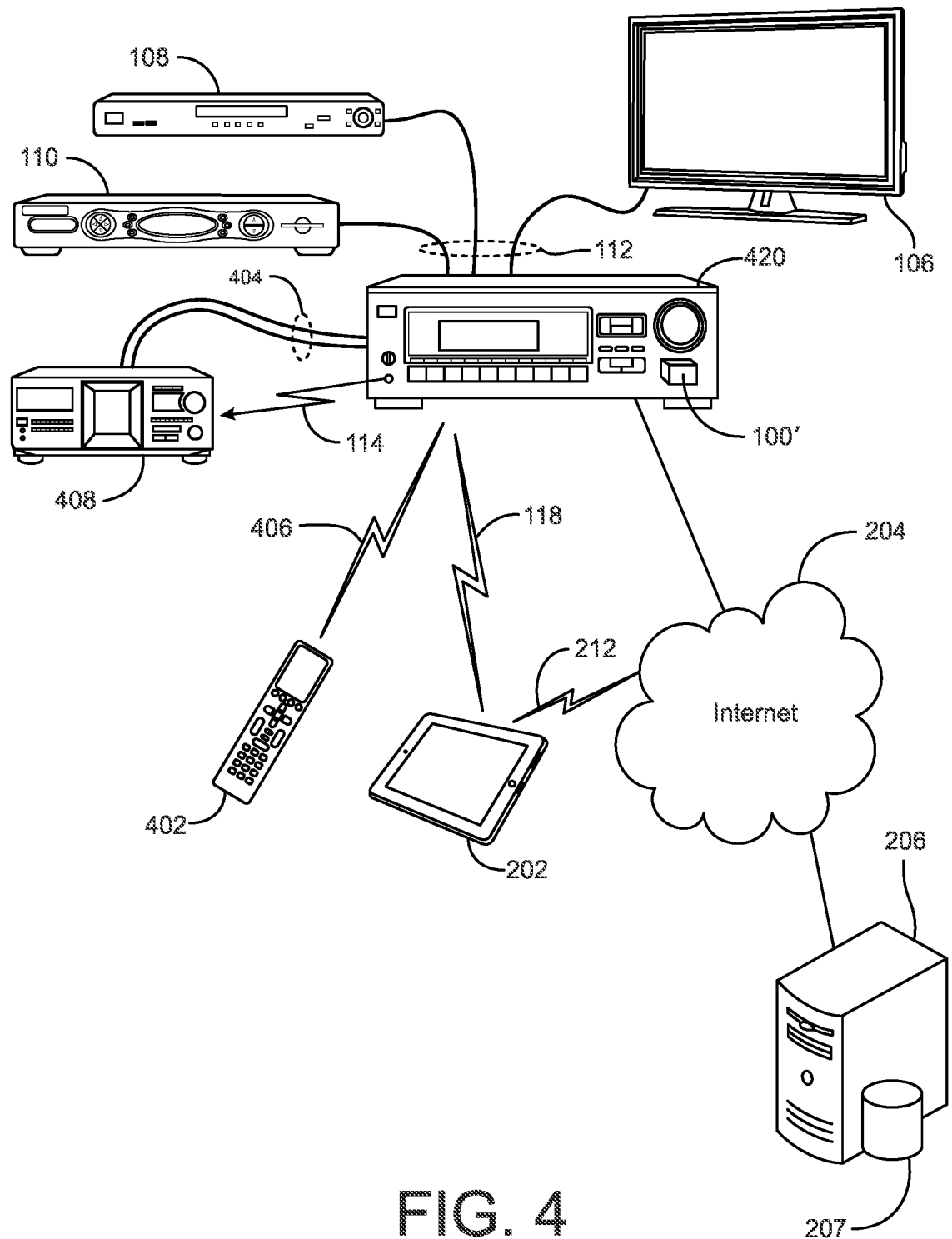

In the further illustrative embodiment of FIG. 4, controlling device functionality 100' may be embedded in an AV receiver 420 which may serve as an HDMI switch between various content sources such as a STB/DVR 110 or a DVD player 108 and a rendering device such as TV 106. In addition to HDMI ports, AV receiver 420 may also support various other port formats, for example analog such as the illustrative input 404 from CD player 408; composite or component video; S/PDIF coaxial or fiberoptic; etc. In this example, request signals 406 may be directed to AV receiver 420, for example from remote control 402, for action by controlling device functionality 100'. As before, resulting appliance commands may be transmitted using CEC signals transmitted over HDMI connections 112, RF, or via IR signals 114 transmitted from an associated IR blaster. As appropriate for a particular embodiment, initial configuration of controlling device functionality 100' to match the equipment to be controlled may be performed by an Internet-connected app resident in AV receiver 420, or by an app resident in tablet computer 202 or other smart device, as mentioned previously in conjunction with FIG. 2.

As will be appreciated, various other configurations are also possible without departing from the underlying controlling device concept, for example controlling device functionality 100' may be incorporated into an Internet-capable TV, an HDMI switch, a game console, etc.; appliance command set and capability database 207 may be located at an internet cloud or a cable system headend, may be stored locally (in all or in part), which local storage may take the form of internal memory within the controlling device itself or in an appliance such as a TV, STB or AV receiver, or may take the form of a memory stick or the like attachable to a smart device or appliance; etc.

Figure 5:
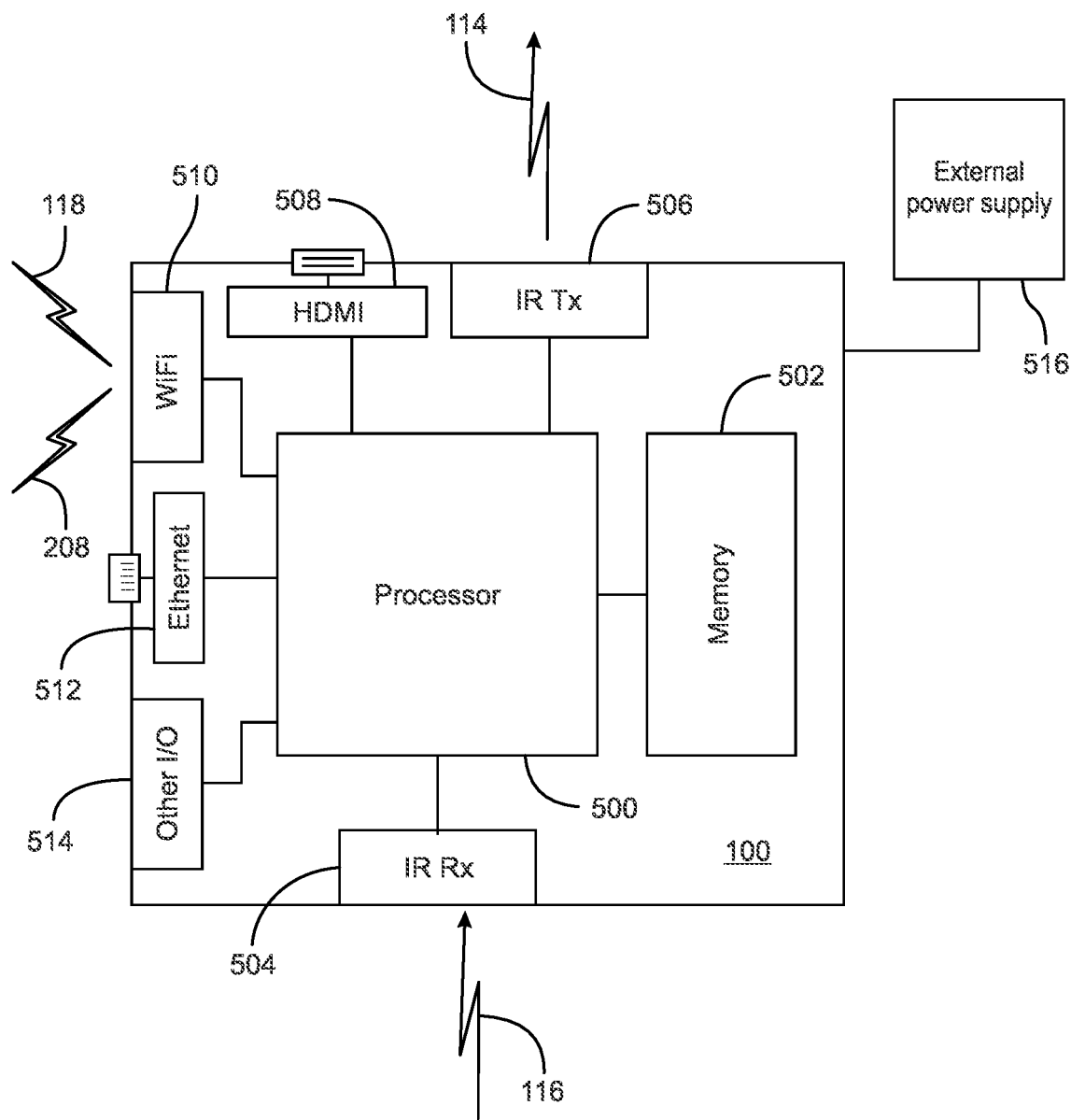
FIG. 5 illustrates a block diagram of an example controlling device.

With reference to FIG. 5, an example controlling device 100 (whether stand alone or in an appliance supporting controlling device functionality) may include, as needed for a particular application, a processor 500 coupled to a memory 502 which memory may comprise a combination of ROM memory, RAM memory, and/or non-volatile read/write memory and may take the form of a chip, a hard disk, a magnetic disk, an optical disk, a memory stick, etc., or any combination thereof. It will also be appreciated that some or all of the illustrated memory may be physically incorporated within the same IC chip as the processor 500 (a so called "microcontroller") and, as such, it is shown separately in FIG. 5 only for the sake of clarity. Interface hardware provisioned as part of the example controlling device platform may include IR receiver circuitry 504 and IR transmitter circuitry 506; an HDMI interface 508; a RF, e.g., WiFi, transceiver and interface 510; an Ethernet interface 512; and any other wired or wireless I/O interface(s) 514 as appropriate for a particular embodiment, by way of example without limitation Bluetooth, RF4CE, USB, Zigbee, Zensys, X10/Insteon, HomePlug, HomePNA, etc. The electronic components comprising the example controlling device 100 may be powered by an external power source 516. In the case of a standalone controlling device such as illustrated in FIG. 1 or 2, this may comprise for example a compact AC adapter "wall wart," while the controlling device componentry of the appliances having controlling device functionality 100', such as illustrated in FIG. 3 or 4, may draw operating power from the appliance into which they are integrated. It will also be appreciated that in the latter case, in certain embodiments processor 500 and/or memory 502 and/or certain portions of interface hardware items 504 through 514 may be shared with other functionalities of the host appliance.

As will be understood by those skilled in the art, some or all of the memory 502 may include executable instructions that are intended to be executed by the processor 500 to control the operation of the controlling device 100 (collectively, the controlling device programming) as well as data which serves to define the necessary control protocols and command values for use in transmitting command signals to controllable appliances (collectively, the command data). In this manner, the processor 500 may be programmed to control the various electronic components within the example controlling device 100, e.g., to monitor the communication means 504, 510 for incoming request messages from other remote controls/smart devices, to cause the transmission of appliance command signals, etc. To cause the controlling device 100 to perform an action, the controlling device 100 may be adapted to be responsive to events, such as a received request message from remote control 102 or smart device 104, changes in connected appliance status reported over HDMI interface 508, WiFi interface 510, or Ethernet interface 512, etc. In response to an event, appropriate instructions within the controlling device programming may be executed. For example, when a command request is received from a smart phone 104, the controlling device 100 may retrieve from the command data stored in memory 502 a preferred command transmission medium (e.g., IR, RF4CE, CEC over HDMI, IP over WiFi, etc.) and a corresponding command value and control protocol to be used in transmitting that command to an intended target appliance, e.g., TV 106, in a format recognizable by that appliance to thereby control one or more functional operations of that appliance. By way of further example, the status of connected appliances, e.g., powered or not powered, currently selected input, playing or paused, etc., as may be discerned from interfaces 508 through 514, may be monitored and/or tabulated by the controlling device programming in order to facilitate adjustment of appliance settings to match user-defined activity profiles, e.g. "Watch TV", "View a movie", etc.

Figure 6:
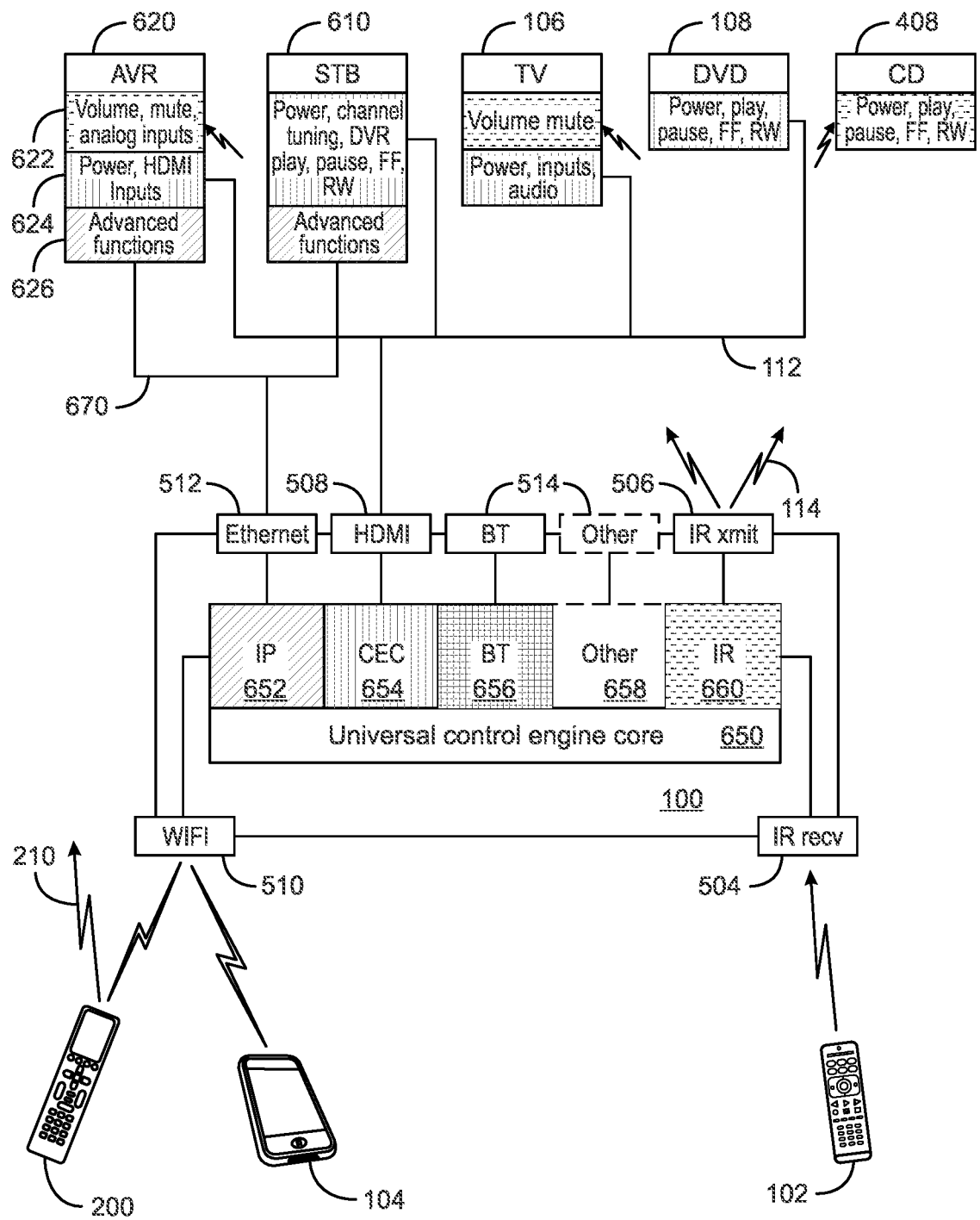
FIG. 6 illustrates a graphical representation of an example control environment.

An overview of an example controlling device control environment is presented in FIG. 6. The controlling device programming of an example controlling device 100 may comprise a controlling device engine core 650 together with a series of scalable software modules 652 through 660, each module supporting a particular appliance command protocol or method and provisioned as appropriate for a particular embodiment. By way of example, the illustrative embodiment of FIG. 6 may include an internet protocol (IP) module 652, a CEC over HDMI module 654, a Bluetooth module 656, an IR module 660, and other modules(s) 658, e.g., an RF module, as appropriate for the particular application. The appliances to be controlled may include an IP enabled AV receiver 620, an IP enabled STB/DVR 610, TV 106, DVD player 108, and CD player 408. As illustrated, certain of these devices may be interconnected via HDMI 112 and/or Ethernet 670 interfaces. (In this regard, it should be appreciated that the illustrative interconnections 112 and 670 of FIG. 6 are intended to depict logical topography only, and accordingly details of exact physical cabling structure and/or the presence of any necessary switches, routers, hubs, repeaters, interconnections, etc., are omitted for the sake of clarity.)

The preferred method/protocol/medium for issuance of commands to the example appliances of FIG. 6 may vary by both appliance and by the function to be performed. By way of example, volume control and analog input selection commands 622 targeted to AV receiver 620 may be required to be issued via IR transmissions, while power on/off and HDMI input selection functionality commands 624 may be better communicated via CEC commands and advanced functionality commands 626 such as sound field configuration may be best communicated via an Ethernet connection. In a similar manner, the various operational functions of the other appliances may be best commanded via a mixture of mediums, methods, and protocols, as illustrated. As will be appreciated, in some instances a particular appliance may support receipt of an operational command via more than one path, for example the power on/off function of AV receiver 620 may be available not only as a CEC command, but also via an IR command. In such instances, the controlling device preferred command transmission format may be that which has been determined to offer the greatest reliability, for example in the above instance the CEC command may be preferred since this form of command is not dependent on line-of-sight and also permits confirmation that the action has been performed by the target appliance.

In order to determine the optimum method for each configured appliance type and command, the example controlling device core program 650 may be provisioned with a preferred command matrix 700, as illustrated in FIG. 7. Example preferred command matrix 700 may comprise a series of data cells or elements, e.g. cells 712, each corresponding to a specific command 702 and a specific one of the appliances to be controlled 704. The data content of such a cell or element may comprise identification of a form of command/transmission to be used and a pointer to the required data value and formatting information for the specific command. By way of example, the data element 712 corresponding to the "Input 2" command 706 for the configured TV appliance 708, may comprise an indicator that a CEC command is to be used, i.e., an indicator of the transmission device that is to be used to communicate the command to the intended target appliance, together with a pointer to the appropriate command data value and HDMI-CEC bus address; while data element 714 corresponding to the same command function for the configured AV receiver 710 may comprise an indicator that an IR command is to be used, together with a pointer to appropriate command data and formatting information within an IR code library stored elsewhere in controlling device memory 502. In certain embodiments one or more secondary command matrices 716 may also be provisioned, allowing for the use of alternate command methods in the event it is determined by the controlling device programming that a preferred command was unsuccessful. Command matrix 700 may also contain null entries, for example 718, where a particular function is not available on or not supported by a specific appliance. In an example embodiment, command matrix 700 may be created and loaded into the memory 502 of controlling device 100 during an initialization and set-up process, as will now be described in further detail.

In order to perform initial configuration of a controlling device, a setup application may be provided. In some embodiments, such a set up application may take the form of programming to be executed on any convenient device with a suitable user interface and capable of establishing communication with the controlling device, such as without limitation a smart phone, tablet computer, personal computer, set top box, TV, etc., as appropriate for a particular embodiment. In other embodiments such a set up application may be incorporated into the controlling device programming itself, utilizing for example a connected TV screen and an associated controlling device as the user interface. Regardless of the exact form and location of the programming and user interface means, the series of steps which may be performed by a controlling device set up application when configuring a controlling device for operation with a specific set of appliances remains similar. Accordingly, it will be appreciated that the methods comprising the illustrative controlling device set up application presented below in conjunction with FIGS. 8 and 9 may be generally applied, mutatis mutandis, to various alternative set up application embodiments.

Figure 8:
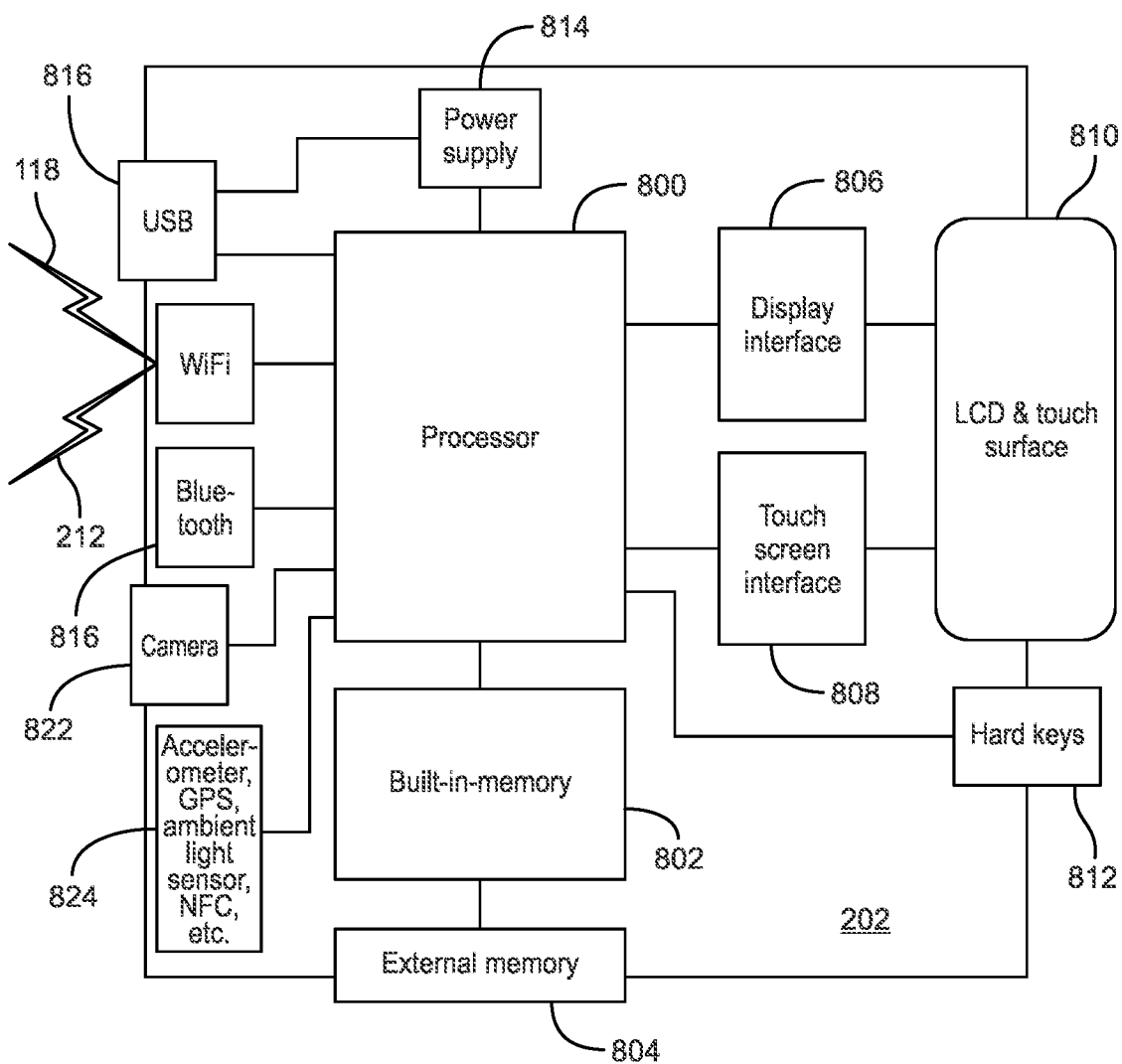
FIG. 8 illustrates a block diagram of an example smart device which may support remote control functionality and a setup method for use in configuring the remote control functionality.

With reference to FIG. 8, a tablet computer, such as the example device 202 of FIG. 2, may comprise, as needed for a particular application, a processor 800 memory 802 which memory may comprise a combination of ROM memory, RAM memory, and/or non-volatile read/write memory and may take the form of a chip, a hard disk, a magnetic disk, an optical disk, a memory stick, etc., or any combination thereof. In some embodiments, provision may also be made for attachment of external memory 804 which may take the form of an SD card, memory stick, or the like. Hardware provisioned as part of an example tablet computer platform may include an LCD touchscreen 810 with associated display driver 806 and touch interface 808; hard keys 812 such as for example a power on/off key; a USB port 816; WiFi transceiver and interface 818; a Bluetooth transceiver and interface 820; a camera 822; and various other features 824 as appropriate for a particular embodiment, for example an accelerometer, GPS, ambient light sensor, near field communicator; etc. The electronic components comprising the example tablet computer device 202 may be powered by a battery-based internal power source 814, rechargeable for example via USB interface 816.

Memory 802 may include executable instructions that are intended to be executed by the processor 800 to control the operation of the tablet computer device 202 and to implement various functionalities such as Web browsing, game playing, video streaming, etc. As is known in the art, programming comprising additional functionalities (referred to as "apps") may be downloaded into tablet computer 202 via, for example, WiFi interface 818, USB 816, external memory 804, or any other convenient method. As discussed previously, one such app may comprise a remote control app, for example as that described in co-pending U.S. patent application Ser. No. 13/329,940 of like assignee and incorporated herein by reference in its entirety, which app may be for use in commanding the operation of appliances 106, 108, 110 and/or 120 directly and/or via controlling device 100. In order to initially configure controlling device 100 to match the appliances to be controlled and to establish an appropriate command matrix, tablet computer 202 may also be provisioned with a setup app 214, either as part of a remote control app or as separately downloadable item.

Figure 9:
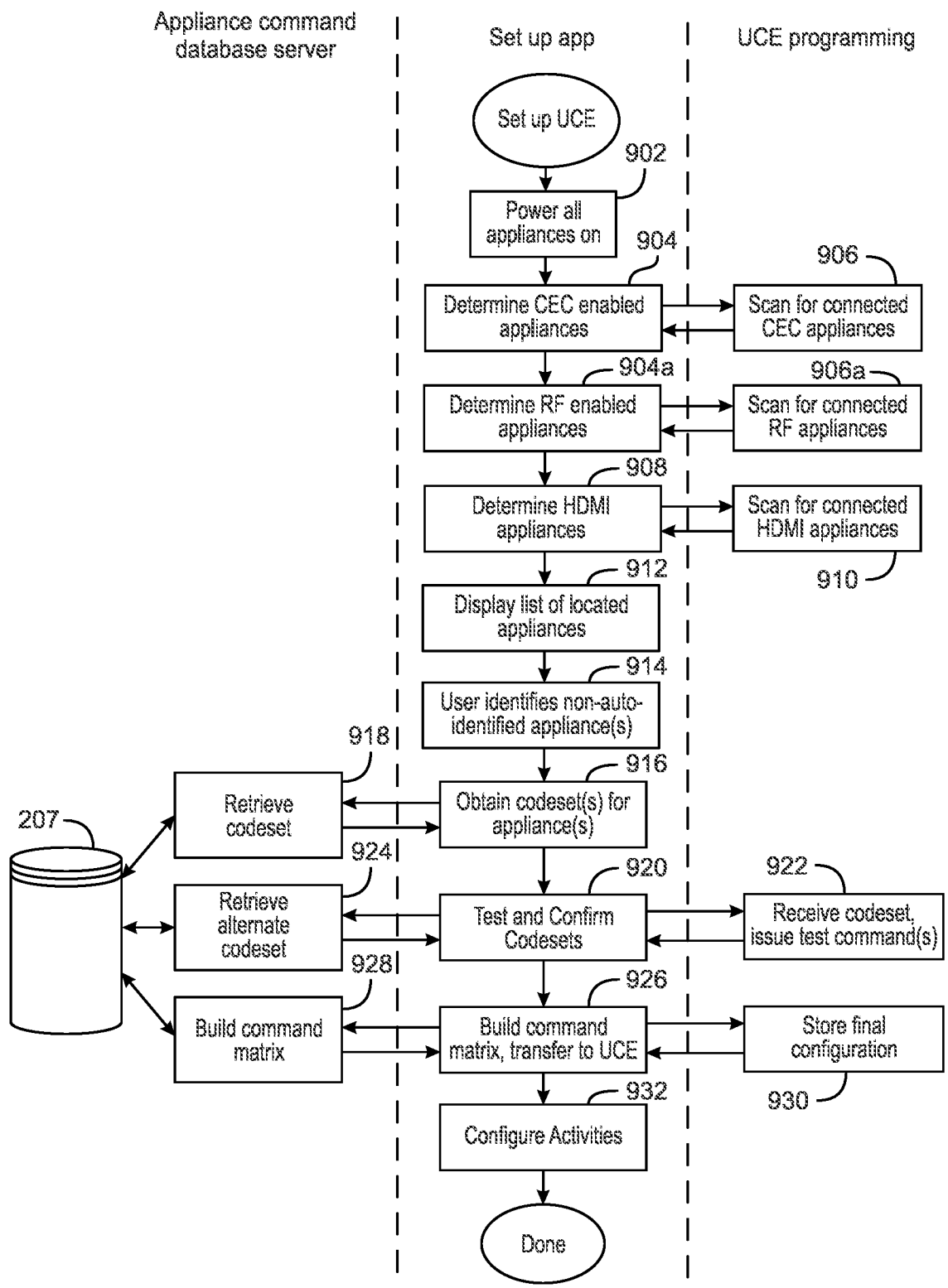
FIG. 9 illustrates an example series of steps which may be performed in order to set up and configure an example controlling device.

With reference now to FIG. 9 such a setup app, upon being invoked at step 902 may initially request that the user place all of the appliances to be controlled into a known state, e.g., powered on, in order to enable the appliance detection and/or testing steps which follow. In some instances, this step may be omitted if it is determined that all appliances that are known to be within the ecosystem are already in a desired state, e.g., powered on. This determination may be made by monitoring the state of hardware that is associated with or otherwise connected to any such appliances. Next, at steps 904 and 904*a* the setup app may determine the identity of those appliances which are CEC-enabled, RF enabled (e.g., RF4CE-enabled), etc. This may be accomplished by communicating a request to the associated controlling device 100, which at step 906 may, for example, cause the controlling device programming to scan connected HDMI devices for appliances which are CEC-enabled and/or identifiable via interaction over the HDMI interface, for example as described in co-pending U.S. patent application Ser. No. 13/198,072, of like assignee and incorporated herein by reference in its entirety, and communicate such appliance identities to the setup application. Likewise, this may be accomplished by communicating a request to the associated controlling device, which at step 906*a* causes the controlling device programming to scan for appliances which are RF-enabled and/or identifiable via interaction over one or more communication interfaces, e.g., those appliances using/supporting the mDNS protocol.

Thereafter, at step 908 the setup application may determine if additional non-CEC appliances are connected to the controlling device via the HDMI interface. This may be accomplished by requesting the controlling device programming to scan for any further HDMI connections at step 910 and communicate the findings back to the setup application. Though not illustrated, it will be appreciated that where appropriate for a particular embodiment the controlling device programming may conduct similar scans to in order to discover appliances connected via Ethernet, USB, Bluetooth, RF4CE, WiFi etc., where such interfaces may be provisioned to a controlling device 100.

Thereafter, at step 912 the setup application may display a listing of detected appliances (both identified and not yet identified) to the user. At step 914, the user may be prompted to enter appliance identifying information for those HDMI or otherwise connected appliances which were detected but not identified, as well as identifying information regarding any additional appliances which may form part of the system to be controlled but are not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; etc.; or any combination thereof as appropriate for a particular embodiment.

As noted above, once sufficient identifying information has been acquired, at step 916 the setup app may communicate that information to a database/cloud server, for example server 206, for performance of step 918, comprising identification of and retrieval of command codeset and capability data corresponding to the identified appliances from a database 207, and provision of this data to the setup application for processing and ultimate transfer to the controlling device 100. As will be appreciated, the transferred codeset may comprise complete command data values, formatting information, and/or one or more further transmission related parameters that would be used to transmit a command via a wireless connection, e.g., IR, RF, etc., or via a wired connection, may comprise one or more pointers to such command data values, formatting information, and/or one or more further transmission related parameters that are already stored in the memories 502 and/or 802/804 of the controlling device or the device upon which the setup application is currently resident, or a combination thereof. Where necessary, for example when database 207 may contain alternate codesets for an identified appliance, or where uncertainty exists regarding a particular appliance model number, etc., at steps 920, 922, and 924 various control paradigms and/or command data sets may be tested against the appliances to be controlled. Such testing may take the form of soliciting user response to effects observable commands, monitoring of HDMI interface status changes as described for example in U.S. patent application Ser. No. 13/240,604, of like assignee and incorporated herein by reference in its entirety, or any other method as convenient for a particular application. Once appropriate codesets have been fully determined, at steps 926, 928 and 930 a suitable preferred command matrix, for example as illustrated in FIG. 7, may be constructed and stored into the memory 502 of example controlling device 100, the matrix being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g., apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g. received IP received packets processed before CEC packets, etc.; type of protocol support (e.g. error correction versus error detection; ack/nak, etc.); or any other factors which may applied in order to achieve optimum performance of a particular embodiment.

As will be appreciated, the construction of said preferred command matrix may be performed at the database server or within the setup application, or a combination thereof, depending on the particular embodiment. Once a preferred command matrix has been finalized and stored in the controlling device, at step 932 a series of desired appliance configurations associated with specific user activities may be configured and stored into the controlling device, as will be now be described.

Figure 10:
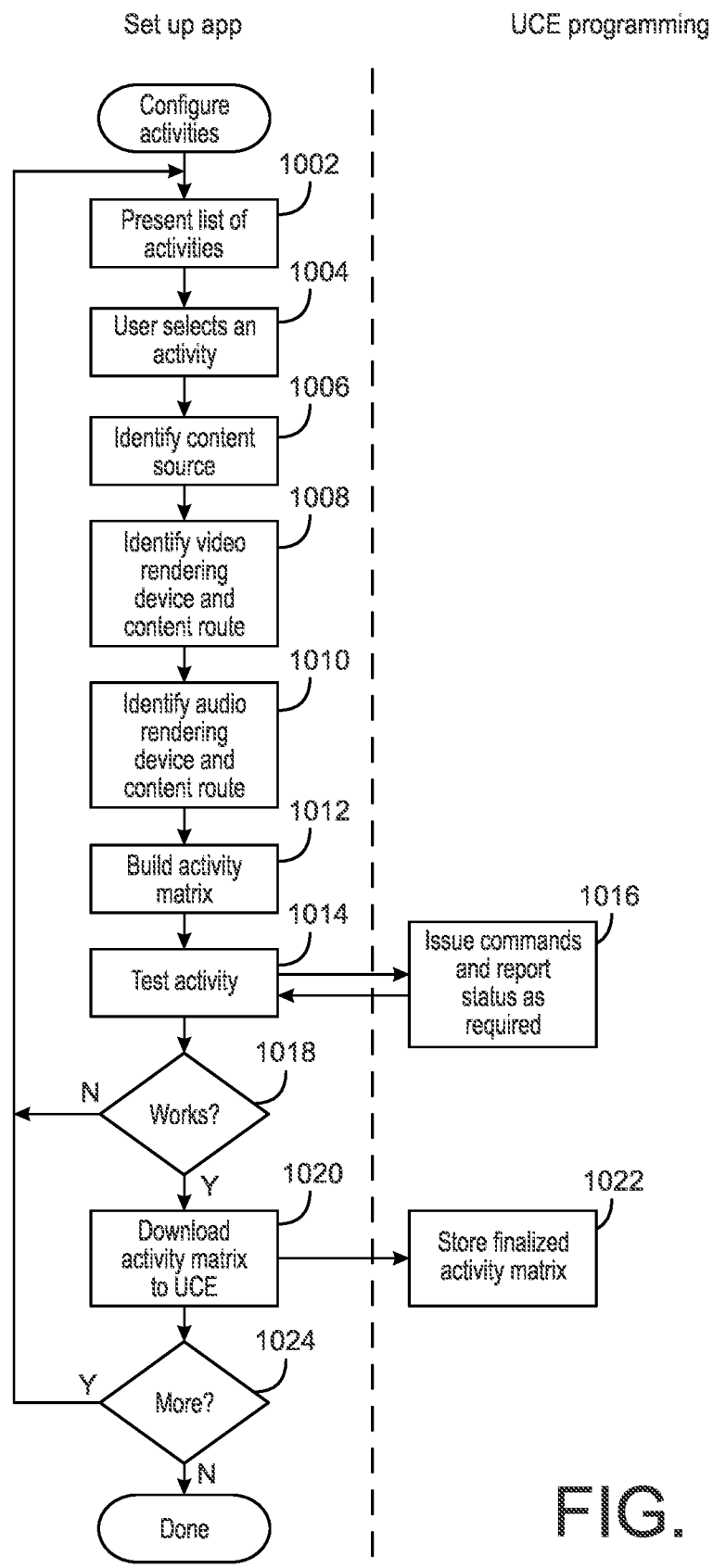
FIG. 10 illustrates an example series of steps which may be performed in order to define to a controlling device an appliance configuration which corresponds to a user activity.
Figure 11:
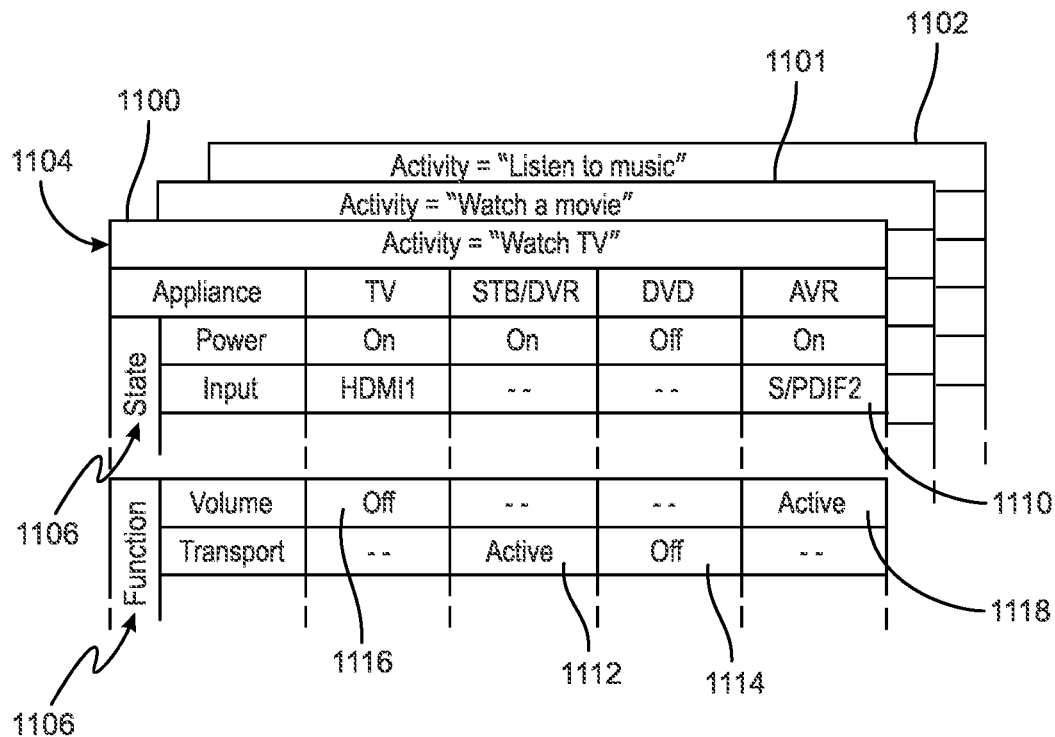
FIG. 11 illustrates example activity configuration matrices such as may be defined during the steps of FIG. 10.

Upon completion and storage of a preferred command matrix, an example setup application may subsequently guide a user through a series of steps in order to establish the desired appliance configurations for a series of possible activities. With reference to FIG. 10, at step 1002, the user may be presented with a list of possible activities, e.g., "Watch TV", "Watch a movie", "Listen to music", etc. In some embodiments, the user may also be able to edit activity titles and/or create additional user defined activities. At step 1004 a user may select a particular activity for configuration, for example "Watch TV". At step 1006, the user may be prompted to identify the content source for the activity being configured, for example cable STB/DVR 110 for the example "Watch TV" activity. Such a prompt may take the form of a listing of eligible appliances as determined during the foregoing appliance set up steps; explicit user entry of an appliance type; etc. Next, at steps 1008 the user may be prompted in a similar manner to select video and audio rendering appliances for use in this activity, for example TV 106 and AVR receiver 120 respectively. Depending upon the system topography and the interfaces in use (i.e. HDMI/CEC, IP, analog, etc.) the set up application in concert with controlling device programming may be able to ascertain which port of each rendering appliance is attached to the content source appliance identified for this activity and/or if any intermediate switching appliance is in use (for example AV receiver 420 of the system illustrated in FIG. 4). Where such information is obtainable, the set up application may automatically create all or part of an appropriate rendering device input selection for the activity being configured. If not, at steps 1008 and 1010, the user may be additionally requested to identify the applicable content route(s) to the rendering appliances, e.g., input port numbers, presence of intermediate switches, etc. During or upon conclusion of steps 1004 through 1010, the set up application may construct an activity matrix, for example as illustrated in FIG. 11. By way of example, activity matrix 1100 for a "Watch TV" activity may comprise a series of cells, for example 1110 or 1112, each corresponding to a desired configuration of a particular state 1106 or function 1108 of a specific appliance 1104 during the specified activity. By way of example, cell 1110 may indicate that the input of AV receiver 120 is to be set to "S/PDIF2", while cells 1112 and 1114 may indicate that transport function commands (e.g., "play", "pause", "fast forward" etc.) are to be directed to STB/DVR 110 and not to DVD 114. In this regard, it will be appreciated that while in some embodiments the assignment of functions such as, for example, volume control, to specific appliances during a particular activity may be performed within an individual controlling device, i.e., the controlling device may determine the appliance to which volume control commands are to be directed, in a preferred embodiment this assignment may be performed within the controlling device 100, thereby ensuring consistency across each activity when multiple remote devices are present in an environment, for example devices 102 and 104 of the environment illustrated in FIG. 1.

Returning now to FIG. 10, at steps 1014 and 1016 the newly-constructed activity matrix 1100 may be tested by causing the controlling device programming, utilizing preferred command matrix 700, to issue the commands necessary to place the identified appliances into the desired state and thereafter receiving verification at step 1018 that the desired activity was successfully initiated. It will be appreciated that such verification may comprise, for example, detection and reporting of HDMI or other content streams and/or appliance status by controlling device programming by directly monitoring CEC status or by using methods such as described for example in U.S. patent application Ser. No. 13/240,604; solicitation of user input confirming correct operation; monitoring for presence or absence of analog input signals; recording of appliance status or error messages; etc.; or any combination thereof as appropriate for a particular embodiment.

If testing is unsuccessful, at step 1018 the set up application may return to step 1002 to allow reconfiguration of that activity and/or definition of alternative activities. If testing was successful, at steps 1020 and 1022 the completed activity matrix, for example 1100 as illustrated in FIG. 11, may be transferred to the controlling device 100 for storage in controlling device memory 502. Thereafter, at step 1024 the user may be offered the opportunity to return to step 1002 to define additional activity configurations, for example 1101, 1102 as illustrated in FIG. 11, or to exit the activity configuration process.

Figure 13:
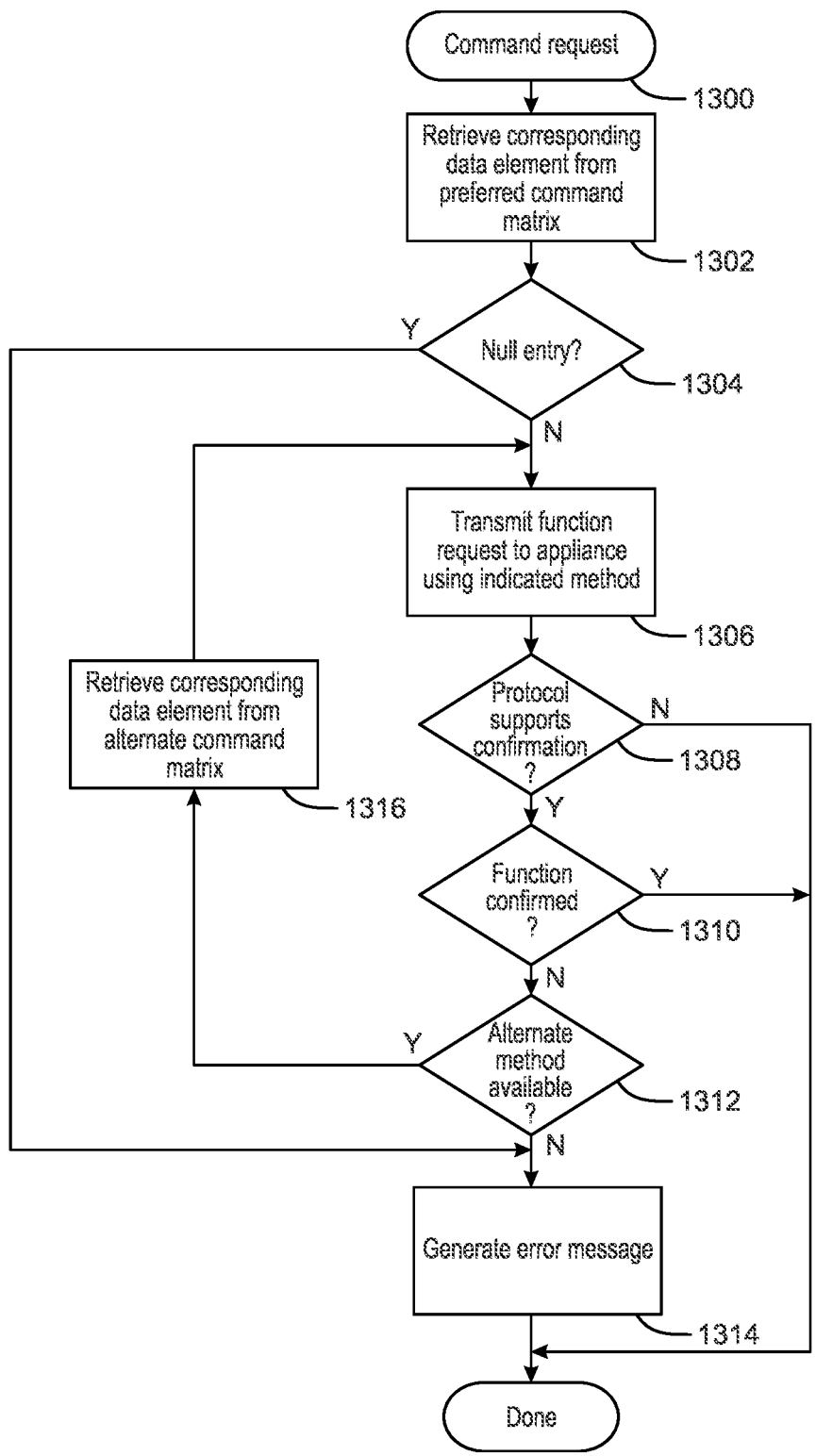
FIG. 13 illustrates an example series of steps which may be performed by a controlling device in issuing a function command to an appliance.

With reference now to FIG. 13, the series of steps performed by the controlling device programming in order to convey a function command to an appliance in accordance with a command request 1300 received from a controlling device such as remote control 102 or 200, smart device 104 or 202, etc., or in accordance with an internally generated requirement resulting from receipt of an activity request (as will be described hereafter) may initially comprise retrieval from a preferred command matrix that data element which corresponds to the requested command and target appliance. By way of specific example, receipt of a "TV power on" request from remote control 102 or the like at a controlling device 100 provisioned with the preferred command matrices illustrated in FIG. 7 may cause retrieval of data element 720, indicating that the command is to be communicated to the TV appliance, e.g., television 106, using an HDMI CEC command. At step 1304, the controlling device programming may determine if the retrieved value constitutes a null element. If so, the referenced appliance does not support the requested command and accordingly at step 1314 an error message may be generated, and the process thereafter terminated. As will be appreciated, the exact nature of such an error message may depend upon the particular embodiment and/or the requesting controlling device: for example, if the request originated from a remote device which is in bidirectional communication with the controlling device 100 the error may be communicated back to the requesting device for action, i.e., display to the user, illuminate a LED, activate a buzzer, etc. as appropriate. Alternatively, in those embodiments where a controlling device is incorporated into an appliance, that appliance's front panel display may be utilized.

If the retrieved preferred command matrix element data is valid, at step 1306 the controlling device 100 may communicate the corresponding function command to the target appliance using the indicated command value and transmission method, e.g., for the example data element 720 this may comprise issuing a CEC "power on" command to CEC logical device address zero (TV) via the controlling device HDMI interface 508. Once the command has been issued, at step 1308 the controlling device programming may determine if the communication interface and protocol used in issuing the command provides for any confirmation mechanism, i.e., explicit acknowledgement of receipt, monitoring of HDMI status on an interface, detection of a media stream or HDCP handshake, etc. If not, for example the command was issued using a unidirectional IR signal and no other confirmation means such as power or input signal monitoring is available, the controlling device programming may simply assume that the command was successful, and processing is complete. If however confirmation means exists, at step 1310 the controlling device programming may wait to determine if the command was successfully executed. Once positive confirmation is received, processing is complete. If no confirmation or a negative confirmation is received, at step 1312 the controlling device programming may determine if an alternative method is available to communicate the command to the target appliance. Returning to the specific example presented above this may comprise accessing a secondary command matrix 716 in order to determine if an alternative communication method is available for the specific function, e.g., "TV power on." If an alternative does exist, at step 1316 the substitute command value and transmission method may be retrieved and processing may return to step 1306 to initiate an alternative attempt. Returning again to the specific example, if the CEC "power on" command corresponding to data element 720 of matrix 700 issued to TV 106 cannot be confirmed, an IR "power on" command encoded according to SIRCS (Sony Infrared Control System) in correspondence with the equivalent data element in secondary matrix 716 may be attempted as a substitute.

Figure 12:
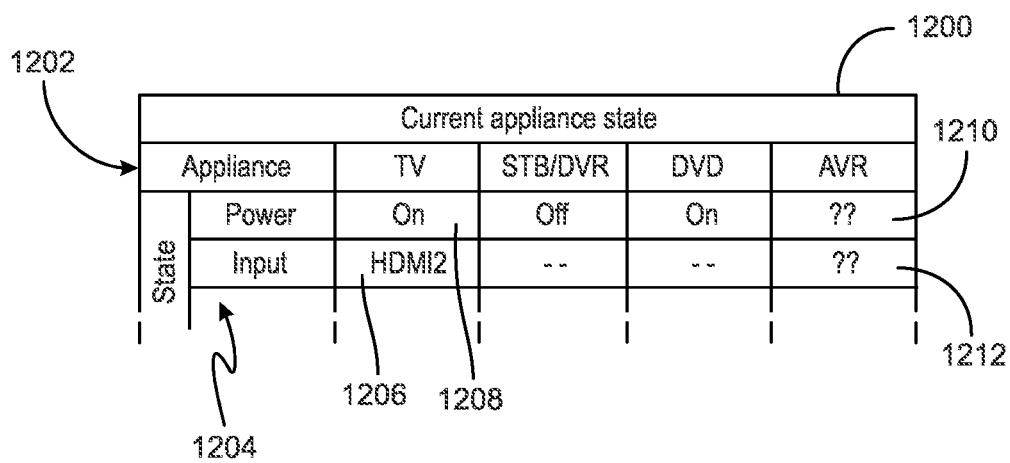
FIG. 12 illustrates an example current appliance state matrix which may be maintained by a controlling device for use in determining the commands necessary to invoke one of the states defined by the matrix of FIG. 11.

In addition to relaying individual command requests as described above, an example controlling device 100 may also support activity selection, whereby receipt of a single user request from a controlling device may cause a series of commands to be issued to various appliances in order to configure a system appropriately for a particular user activity, such as for example, watching television. To this end a set of matrices defining desired equipment states suitable to various activities, for example as illustrated at 1100 through 1102 of FIG. 11, may be stored in controlling device memory 502 for access by controlling device programming when executing such a request. As illustrated in FIG. 12, in some embodiments the programming of an example controlling device may maintain an additional matrix 1200 representative of the current state of the controlled appliances, arranged for example by appliance 1202 and by operational state 1204. By way of example, data elements 1206 and 1208 in the illustrative table 1200 may indicate that TV 106 is currently powered on (1208) with HDMI port number 2 selected as the input (1206). The data contents of the elements in such a table may be maintained in any convenient manner as appropriate to a particular embodiment, for example without limitation retrieval of HDMI/CEC status; monitoring input media streams and/or HDCP status; measuring power consumption; construction of a simulated appliance state such as described for example in U.S. Pat. No. 6,784,805; etc.; or any combination thereof. In the case of certain appliances, such as for example AV receiver 120 which may be controllable only via unidirectional IR, the current state of the appliance may not be discernible. In such cases, a null data element 1210 maybe entered into example matrix 1200 to indicate that this appliance may require configuration using discrete commands only and/or user interaction. As will be appreciated, in some embodiments the data contents of the illustrative table may be maintained in memory 502 on an ongoing basis by controlling device programming, while in other embodiments this data may be gathered "on the fly" at the time the activity request is being processed. Combinations of these methods may also be used, for example "on the fly" gathering for appliances connected via an HDMI bus combined with maintenance of a simulated state for appliances controlled via IR signals.

Figure 14:
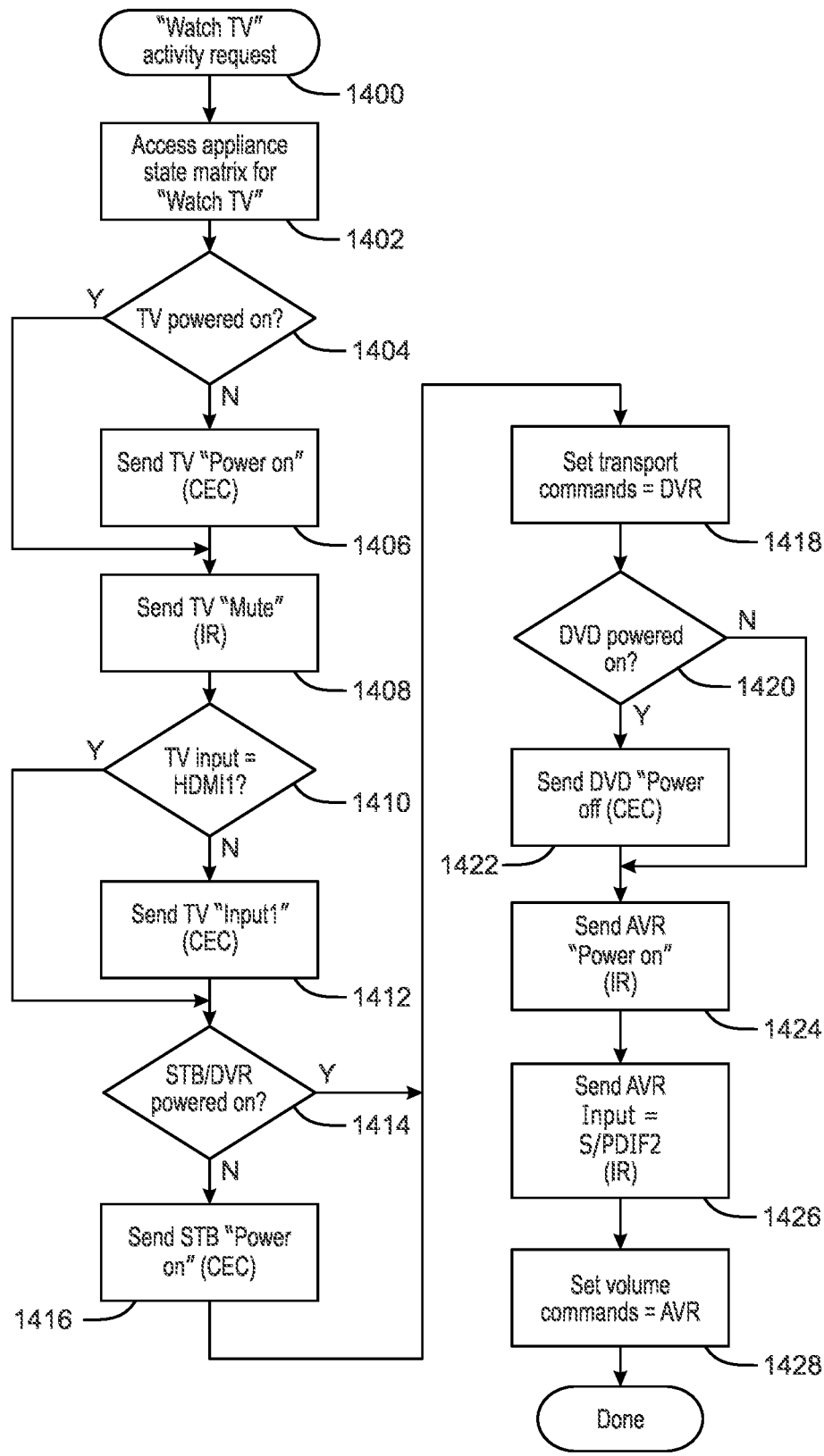
FIG. 14 illustrates an example series of steps which may be performed by a controlling device in establishing appliance states matching a desired activity defined in one of the matrices of FIG. 11.

In order to configure a group of appliances for a desired activity, controlling device programming may compare a desired state matrix, for example 1100, to a current state matrix, for example 1200, element by element, issuing commands as necessary to bring appliances to the desired state. By way of example, an example series of steps which may be performed by the programming of a controlling device in order to effect a "Watch TV" activity configuration will now be presented in conjunction with FIG. 14. For the purposes of this example, the reader may also wish to reference the equipment configuration of FIG. 1 and the activity and current state matrices 1100 and 1200 of FIGS. 11 and 12.

Upon receipt of a "Watch TV" request 1400, at step 1402 the example controlling device programming may access an applicable appliance state matrix 1100. Next, at step 1404 it may be determined by the controlling device programming whether the present "power" state of TV 106 as indicated by current state matrix 1200 matches the desired state stored in the corresponding data element of matrix 1100. If the states match, processing may continue at step 1408. If the states do not match, at step 1406 a "power on" command may be communicated to TV 106. As will be appreciated from the earlier discussion in conjunction with FIG. 13 and inspection of example preferred command matrix 700, in the illustrative system communication of the "power on" command to TV 106 may comprise a CEC command issued over HDMI connection 112. Next, at step 1408 a "mute" command may be communicated to TV 106, since element 1116 of illustrative matrix 1100 indicates that TV 106 is not the primary audio rendering appliance. In accordance with preferred command matrix 700, communication of the "mute" command to TV 106 may comprise an IR transmission 114. Thereafter, at steps 1410,1412 the active input of TV 106 may be set to "HDMI1" via a CEC command, and at steps 1414, 1416 a CEC "power on" command may be communicated to STB/DVR 110 if that appliance is not already powered on. At step 1418, the example controlling device programming may set an internal status to indicate that future transport command requests (e.g., play, pause, FF, etc.) should be routed to STB/DVR 110, as indicated by element 1112 of matrix 1100. Thereafter, at steps 1420, 1422 a CEC "power off" command may be communicated to STB/DVR 108 if that appliance is not already powered off. Thereafter, at steps 1424 and 1426 "power on" and "input S/PDIF2" commands may be communicated to AV receiver 120 via IR signals. As will be appreciated, it may not be possible to determine the current status of AV receiver 120, as indicated for example by elements 1210 and 1220 of matrix 1200, and accordingly so-called "discrete," or explicit, function commands may be issued which may establish the desired status regardless of the current state of the appliance. Finally, at step 1428 the example controlling device programming may set an internal status to indicate that future volume control command requests (e.g. volume up/down, mute) should be routed to AV receiver 120, as indicated by element 1118 of matrix 1100, where after processing of the activity request is complete.

Figure 15:
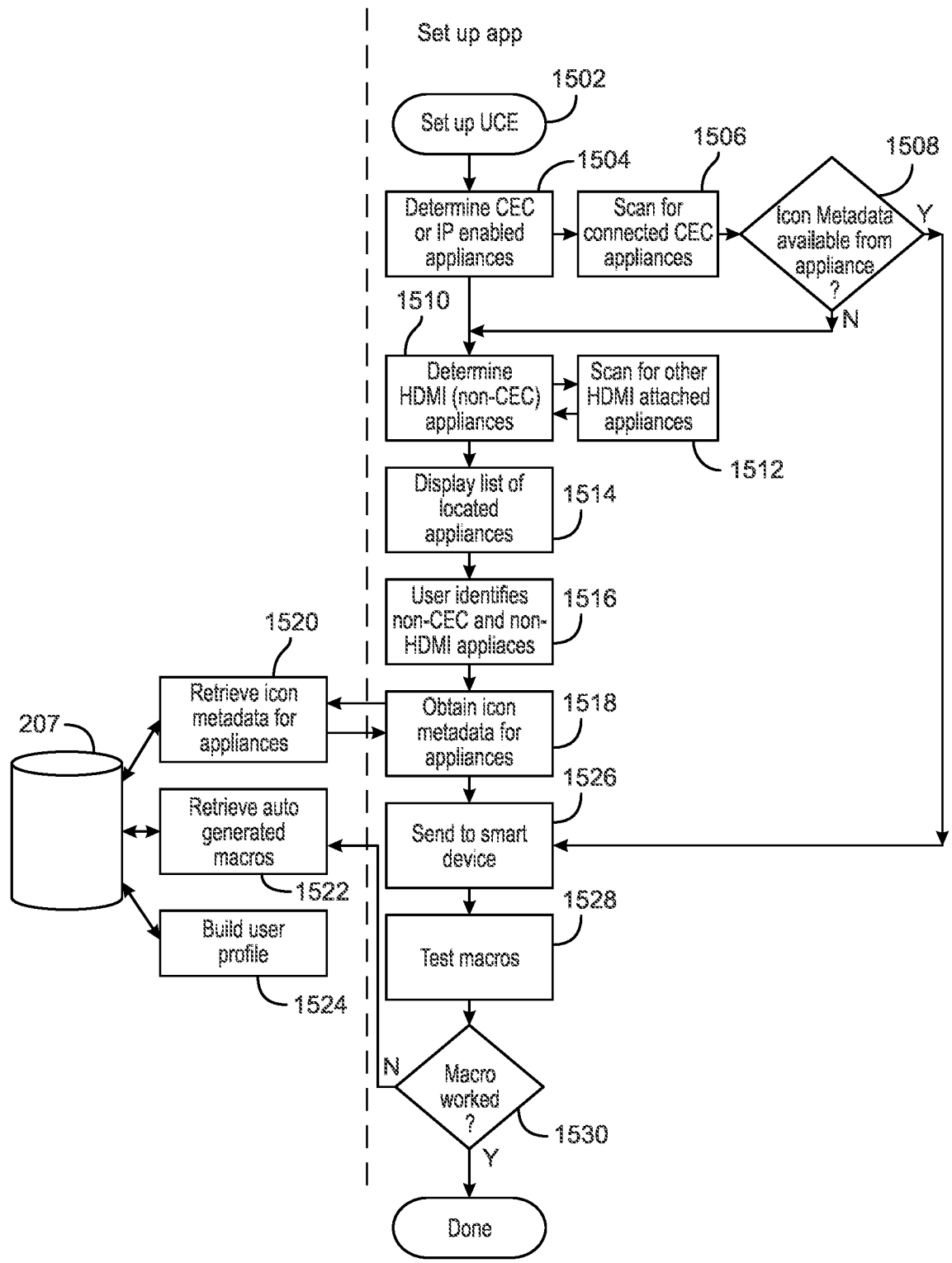
FIG. 15 illustrates an example series of steps which may be performed by a smart device to setup command control macros.

As noted above, the example controlling device 100 may also support activity selection, whereby receipt of a single user request from a smart device/remote may cause a series of commands to be issued to various appliances in order to configure a system appropriately for one or more user activities, such as "watch TV," "watch movie," "listen to music," etc. To setup the user interface of the smart device to support such macro command functionality, an example method is illustrated in FIG. 15. More particularly, with reference to FIG. 15, upon invocation of a setup app at step 1502 a user may be requested to place all of the appliances to be controlled into a known state, e.g., powered on or already joined in a wireless network, in order to enable the appliance detection and/or testing steps which follow. Next, at step 1504 the setup app may determine the identity of those appliances which are CEC-enabled or IP enabled. This may be accomplished by communicating a request to the associated controlling device, which at step 1506 may cause the controlling device programming to scan connected HDMI devices for appliances which are CEC-enabled and/or identifiable via interaction over the HDMI interface, for example as described in co-pending U.S. patent application Ser. No. 13/198,072, of like assignee and incorporated herein by reference in its entirety, and communicate such appliance identities to the setup application. Next, at step 1508 the setup app may also determine if the appliances have any associated icon information (for example stored as metadata on the appliance, available from a remote server, or the like) as well as information related to interface connection types, e.g., WI-FI, HDMI input/output, for use in the creation of supported macros. If the icon information is available, the icon information may be sent to the smart device by the appliance and/or retrieved by the smart device using other information provided by the appliance as appropriate as shown in step 1526. An icon corresponding to the icon information may then be automatically added to the user interface of the smart device whereupon an activation of the added icon may be used to provide access to command and control functionalities associated with the corresponding controllable device, including commands in the form of a listing of automatically generated macros available for that controllable device as described below. Thus, icon information provided to the smart device may be used in connection with information stored on the smart device, stored in the internet cloud and/or at a remote server to automatically add an icon to the user interface of the smart device where the icon can be in the form of a logo for the controllable appliance, icons in the form of logos for content (e.g., television station logos) that can be accessed via the controllable appliance, etc. In a further illustrative embodiment, icons may function as soft keys which may be selected to cause the performance of a further action for example, to display a device control page (e.g., to present television control soft keys such as channel up, channel down, etc.), cause the transmission of commands, etc. as described for example in U.S. patent application Ser. No. 10/288,727, (now U.S. Pat. No. 7,831,930) of like assignee and incorporated herein by reference in its entirety, or any other method as convenient for a particular application.

The setup application then continues to step 1510 (after scanning for CEC connected appliances as discussed above) whereat the setup application may next determine if additional non-CEC appliances are connected to the controlling device via the HDMI interface. This may be accomplished by requesting the controlling device programming to scan for any further HDMI connections at step 1512 and communicate the findings back to the setup application. Though not illustrated, it will be appreciated that, where appropriate for a particular embodiment, the controlling device programming may conduct similar scans in order to discover appliances connected via Ethernet, USB, Bluetooth, RF4CE, WiFi etc., where such interfaces may be provisioned to a controlling device 100.

Thereafter, at step 1514 the setup application may display a listing of detected appliances (both identified and not yet identified) to the user. At step 1516, the user may then be prompted to enter appliance identifying information for those HDMI or otherwise connected appliances which were detected but not identified, as well as identifying information regarding any additional appliances which may form part of the system to be controlled but which were not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; MAC address; etc.; or any combination thereof as appropriate for a particular embodiment.

Once appropriate identifying information has been acquired, at step 1518 the setup app may communicate that information to a database server, for example server 206, for performance of step 1520 in which the database server uses the identification information to retrieve icon information as needed (e.g., when such data was not obtainable from the appliance), command information as discussed previously, and in step 1522, to automatically generate macros which correspond to the appliance or a plurality of appliances considering their capability data as maintained in a database 207 and/or as retrieved from the appliances. Any such data gathered from and/or created by the server 206 will then be provisioned to the setup application for processing and ultimate transfer to the smart device and/or controlling device as required. As will be appreciated, the transferred information and/or metadata may comprise complete command data values, appliance input/output data and current status, formatting information, pointers to command data values and formatting information already stored in the memories 502 and/or 802/804 of the controlling device or the device upon which the setup application is currently resident, etc. Where necessary, for example when database 207 may contain alternate codesets, icon metadata, or macro information for an identified appliance, or where uncertainty exists regarding a particular appliance model number, etc., at steps 1528, 1530, and 1522 various control paradigms and/or command data sets may be tested against the appliances to be controlled. Such testing may take the form of soliciting user response to effects observable commands, monitoring of HDMI interface status changes as described for example in U.S. patent application Ser. No. 13/240,604, of like assignee and incorporated herein by reference in its entirety, or any other method as convenient for a particular application. Once appropriate codesets and macro operations have been fully determined, at steps 1528 and 1530 a suitable preferred user profile 1524, may be constructed and stored into the memory 502 of example controlling device 100, the user profile 1524 being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g. apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g. received IP received packets processed before CEC packets, etc.; type of protocol support (e.g. error correction versus error detection; ack/nak, etc.); or any other factors which may applied in order to achieve optimum performance of a particular embodiment.

As will be appreciated, the construction of said user profile 1524 may be performed at the database server or within the setup application, or a combination thereof, depending on the particular embodiment.

Figure 16:
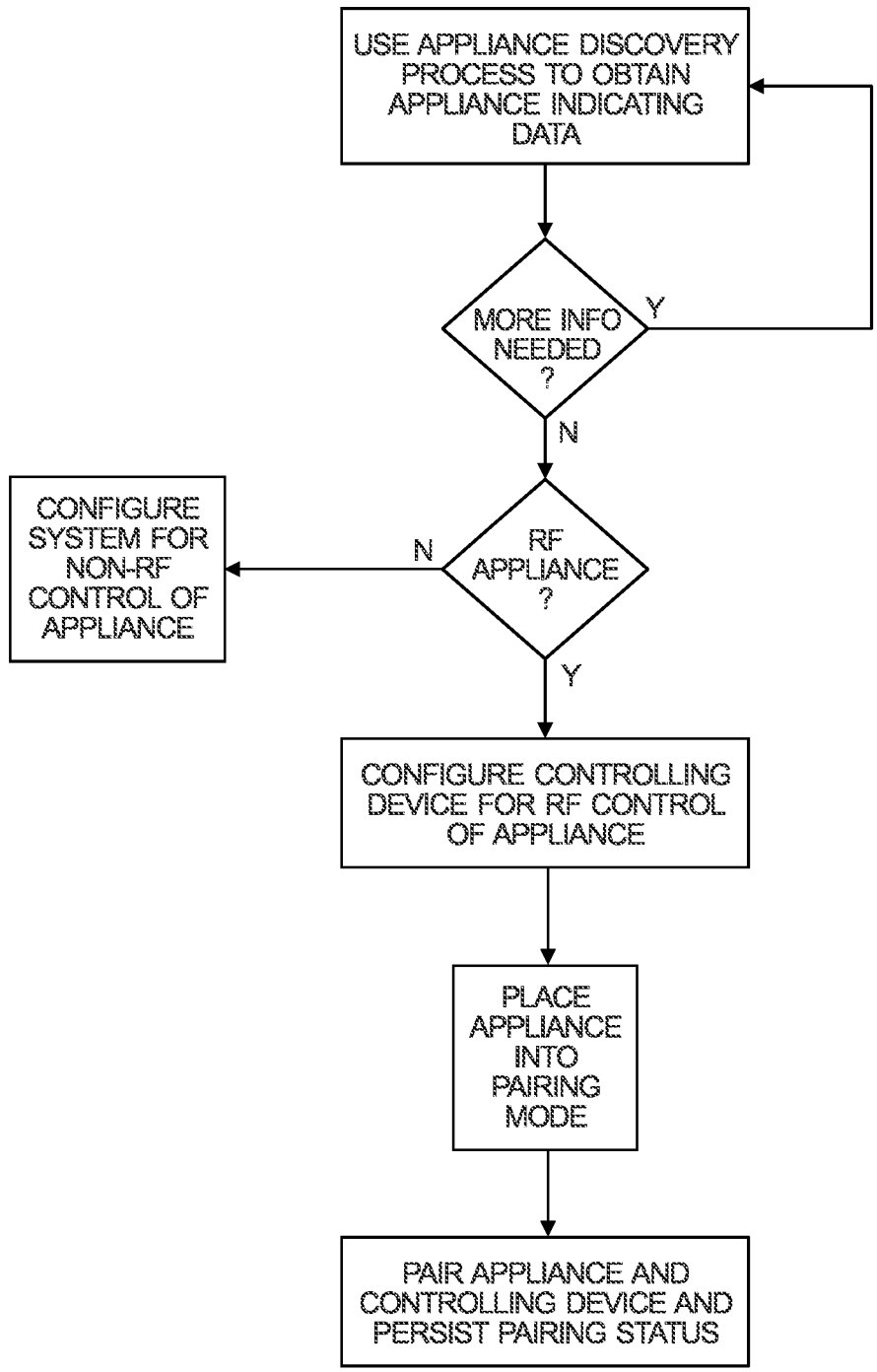
FIG. 16 illustrates an example series of steps which may be performed to configure an RF-based controlling device.

It is also contemplated that the methods described above can be used to provide a controlling device with universal RF controlling capabilities. To this end, as illustrated in FIG. 16, a host device, e.g., a device 100 having some or all of the controlling device functionalities described above, can use an appliance discovery process, which may entail using a multicast discovery schema, to obtain information about one more appliances 106, 108, 110, etc. For example, the host device may, through use of the appliance discovery process, such as described in U.S. application Ser. No. 13/198,072, receive from an appliance through use of an interconnection with the appliance, e.g., a wired or wireless coupling between the appliance and the host device, first appliance related data, e.g., appliance ID, brand name, model number, name, parameters associated with a communication methodology supported by the appliance, etc. The first appliance related data retrieved from the appliance (if the first appliance related data does not itself indicate that the appliance is responsive to a particular RF protocol) can then be used to determine if the first appliance related data received from the appliance corresponds to a single one of the plurality of appliance records/appliance profiles that are stored within a database (for example, a database associated with a cloud server) or multiple ones of the plurality of appliance records stored within the database as described previously.

When it is determined that the first appliance related data received from the appliance corresponds to a single one of the plurality of appliance records stored within the database and the single one of the plurality of appliance records indicates that the appliance is adapted to receive command communications via use of a RF communications channel, e.g., the appliance is RF4CE compliant, an RF codeset identifier associated with the one of the plurality of appliance records may be used to select from a plurality of codesets the RF codeset that is supported by that appliance. A controlling device in communication with the host device (or the host device itself) can then be provisioned with the indicated RF codeset—as described above—to thereby configure the controlling device (or the host device in the event the host device is intended to be a controlling device) to issue commands directly to the appliance, via use of a RF transmitter, where the command that is caused to be issued for reception by the appliance will correspond to a command event received at the controlling device, e.g., an event indicative of an input element being activated, a communication being received from an external device, etc.

When it is determined that the first appliance related data received from the appliance corresponds to multiple ones of the plurality of appliance records within the database, further appliance related data, e.g., further ones of appliance ID, brand name, model number, name, parameters associated with a communication methodology supported by the appliance, etc., is caused to be iteratively received from the appliance through use of the same or other interconnections with the appliance until such time as no further appliance related data is capable of being retrieved from the appliance or until such time as all appliance related data received from the appliance corresponds to a single one of the plurality of appliance records stored within the database. Again, as before, when it is determined that the collective appliance related data received from the appliance corresponds to a single one of the plurality of appliance records within the database and the single one of the plurality of appliance records indicates that the appliance is adapted to receive command communications via use of a RF communications channel, e.g., the appliance is RF4CE compliant, an RF codeset identifier associated with the one of the plurality of appliance records may be used to select from a plurality of protocol codesets the RF codeset that is supported by that appliance. A controlling device, e.g., remote control 104 in communication with the host device (or the host device itself), can then be provisioned with the indicated RF codeset to thereby configure the controlling device (or the host device) to issue commands directly to the appliance, via use of a RF transmitter, where the command issued will correspond to a command event. Thus, it is to be appreciated that automatic device discovery and pairing actions described herein may be possible using partial data received from and or communicated via one or more input/output connections of one or more protocol types and that the controlling device having controlling device functionality may accordingly have multiple input/output connections and support one or more protocol types. For example, the controlling device having controlling device functionality may support BLUETOOTH low energy (BLE), ZIGBEE, and/or RF4CE or otherwise use the same radio but with a different network protocol stack without limitation.

Once the appliance discovery and configuration processes have been completed and the controlling device loaded with the specific profile for the appliance, a RF pairing operation between the controlling device and the appliance is caused to be performed. In some instances, a command to place the appliance into a state for pairing the appliance with the controlling device may be transmitted to the appliance, whether initiated automatically upon conclusion of the discovery and configuration processes or initiated manually, via use of a protocol, e.g., IR, IP, CEC, etc., that the appliance profile indicates the appliance is responsive to. In this regard, the command for placing the appliance into a state for pairing may be issued from the controlling device or the host device as desired and in keeping with communication links available for use in transmitting such a command. In other instances, human interaction with a pairing button or other input element provided on the appliance to place the appliance into a pairing state may be required for this purpose. In the pairing state, the devices will exchange pairing information as needed to allow the devices to be subsequently communicatively linked together when proximate to each other whereby the controlling device can be used to communicate commands to the appliance via use of the appropriate RF protocol. If needed, a user may be required to enter a pin into the system, as known in the art, to facilitate such pairing. An example communication exchange to facilitate a pairing between a remote control and an appliance for use in transmitting RF4CE commands to the appliance may be found in U.S. Pat. No. 9,866,892 the disclosure of which is incorporated herein by reference in its entirety.

Once an appliance and a controlling device are paired, it will be appreciated that if it is determined that the appliance does not respond to a command transmitted via use of a provisioned RF protocol, e.g., determined by monitoring an HDMI connection, other command transmission protocols, such as CEC, IR, etc., can be used to convey a command as described above.

When information is collected from IOT devices via use of a discovery process associated with a multicast protocol, such as mDNS, the mDNS signatures collected from the IOT devices typically contain host names and service names as two major data fields. When the host name and service name indicate original information, such as manufacturer provided brand and model information for an IOT device, the original information can be extracted from the collected information and used in the configuration processes as discussed above. However, when the information in the host name and service name data fields has been modified, a process, described in greater detail below, allows the system to still use the collected information to identify the brand and model for an IOT device and, thereby, to configure the controlling device to control functional operations of an intended target appliance via use of one or more communication protocols.

More particularly, it is known that a user sometimes causes the settings of an IOT device to be modified whereupon the desired information, like IOT brand and model is replaced with personal information like an individual's name. By way of example only, such collected information may look like the following: {"ServiceNames":["HP Officejet 4630 series @ Jana'sMacBook"],"HostNames":["Janas-MacBooklocal"]};{"HostNames":["HP OfficeJet Pro 8720 @ Thomass Mac mini"]; and {"ServiceNames":["UIEMS"], "HostNames":["/192-168-5-87.local","Andreas-iPhone.local","Android"]. To address the problem caused by the original information being replaced with user provided information in mDNS, SSDP, and the like data blocks, data analytics and pattern matching is used to predict the lost, original data, e.g., a manufacturer provided brand and/or model information To replicate the lost, original data, analytics is performed by, for example, clustering mDNS, SSDP, and the like signatures by brand, by model series, by data patterns, and the like. K means clustering may be used for this purpose. The clustered data will provide an analytical logic dictionary with original and edited words. The analytics engine will then access the clustered data as needed to predict the data that should replace any personal data in the information retrieved from an IOT device, e.g., to replace user data with the relevant data from the logic dictionary, whereupon the configuration processes will again have access to substantially normalized mDNS and SSDP signatures which can be used for configuration purposes.

An analytics engine that may be suited for use in predicting the replacement data is comprised of an Artificial Neural Networks ("ANN") which utilizes a Keras library. ANN is a system which is modeled as an inspiration of biological neural network but with a simpler structure. The main feature of these systems is that they have fully parallel, adaptive, learning and parallel distributed memories. ANN is composed of processor components connected with neurons. Generally, it consists of three layers, i.e., an input layer, one or more hidden layers, and an output layer. Each layer has a certain number of components attached to one another called neurons or nodes. Each neuron in the input layer is connected to each neuron in the intermediate (hidden) layer. Also, each neuron in the hidden layer is connected to each neuron in the output layer. Each of the neurons is connected to the other with weights and accompanying communication networks. ANN is trained with sample data to learn the relationship between inputs and outputs. The process of learning and training is performed by varying weight values of the connections between neurons. Signals move through neurons overweight. Each neuron receives multiple inputs from other neurons depending on their weights and generates an output signal that may also be generated by another neuron. Meanwhile, Keras is a high-level neural networks API. The main type of model is called a Sequence which is a linear stack of layers. A sequence is created and layers are added to the created sequence in the order computations are to be performed.

More particularly, the input layer of the multilayer ANN architecture is intended to take the independent data pertaining to the fields of mDNS signature. These independent data are converted into a sigmoid data between 0 to 1 using an activation function. The function used in this example is Relu. The neurons in the hidden layers process the summation of the information received from the connections of the input layer. The hidden layer then processes the summations with its activation function and distributes the result to the next layer. This process continues down through the layers to the output layer where the processed output information is computed and presented, i.e., this layer returns the predicted probabilities of each class. Learning in ANN consists of updating network architecture and connection weights so that the network can efficiently predict the output. Performance is improved over time by iteratively updating the weights in the network. Weights are updated at every iteration to allow the network to produce an output class as close as possible to the known correct output class.

Figure 17:
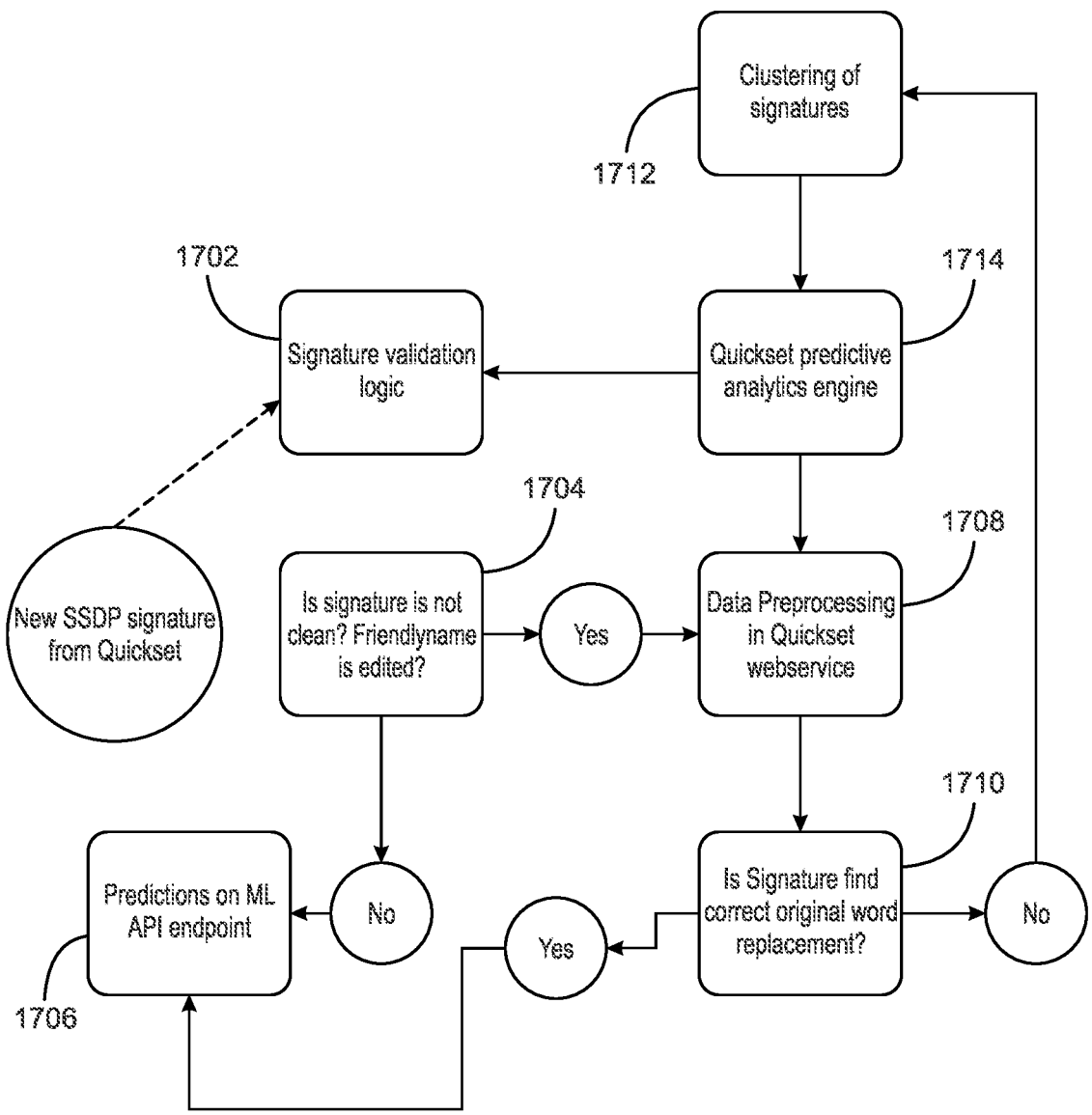
FIG. 17 illustrates an example series of steps for using a multicast service to configure a controlling device.

Turning now to FIG. 17, an example process for collecting data, such as mDNS data, clustering the collected data based on data patterns, and using the clustered, collect data to correct user changed, original information to achieve good device identity predictions for IOT devices for use in connection with a controlling device configuration process is generally illustrated. In the illustrated example, data from the IOT devices may be obtained from the IOT devices via use of an appropriate discovery process, for example the discovery process associated with Universal Electronic Inc.'s "QUICKSET" controlling device configuration service. The obtained data is then examined 1702 to decide whether the mDNS/SSDP signature indicates that the original data has been edited/modified by user/consumer, e.g., signature validation logic compares the mDNS/SSDP signature with analytics engine data to decide whether the collected signature is edited or valid and original. In addition, the obtained data is examined to determine if the obtained data needs to be cleaned from any unwanted data. If the data is clean and the data includes the original information, such as manufacturer provided information that is needed, i.e., the data has not been overwritten with user information, the data may be passed 1706 to the ML process for cataloging and to the controlling device configuration process for use as described above, namely, to select command codes, protocol(s), and the like for use in setting up the controlling device to communicate commands to an IOT, intended target appliance. In this regard, the brand predictive analytics engine has the dictionary of valid/non-edited signatures for reference/lookup. As noted above, these dictionaries are built by clustering signatures and drawing patterns from them, as can be seen in "clustering of signatures" 1712.

If it is determined that the data needs to be cleaned, a cleaning process 1708 is performed and, after cleaning, the data is again examined to determine if the cleaned data includes the original information that is needed, i.e., the data has not been overwritten with user information, and, if the needed data is present, the data may likewise be passed 1706 to the ML process for cataloging and to the controlling device configuration process for use as described above. Auto data preparation scripts can be used to clean unwanted symbols from the collected signature and the cleaned data may then be fed to K means clustering model for the purposes described herein.

When the collected data includes user data that needs to be replaced with data that can be used to identify the IOT device, the data is passed 1712 to the analytics engine for clustering whereupon the data may be analyzed 1714 to see the correlation (if any) between the various data features in the collected data, i.e., the IOT device signature, and the target variable(s), such as the brand and model of the IOT device. In this regard, those of skill in the art will appreciate that clustering is the process of dividing the entire data into groups (also known as clusters) based on the patterns in the data and k-means clustering is a method of vector quantization clustering that is particularly suited to large data sets like mDNS data.

Thus, the cleaned data may be given as input to the K-means clustering model and, based on clusters created and data patterns present in same clusters, the user modified data will be replaced by the most occurring data in the same cluster. This clean, updated mDNS data—which can again be verified—can then be fed to ML models to predict different attributes and autodetect IOT devices as per the steps noted above.

Based on the input features desired, and taking into account their reasonable accuracy metrics and performance, at least the following two ML models may be utilized in the subject system, natural language processing (NLP) with count vectorizer and neural network with hash vectorizer. NLP with count vectorizer provides case-based parameter tuning to get optimum accuracy metrices on the validation data while training the model to predict correct brand, model, and device type as needed. Neural network with hash vectorizer provides an artificial neural network that can be tuned with existing training data to get maximum performance and optimum accuracy matrix.

Figure 18:
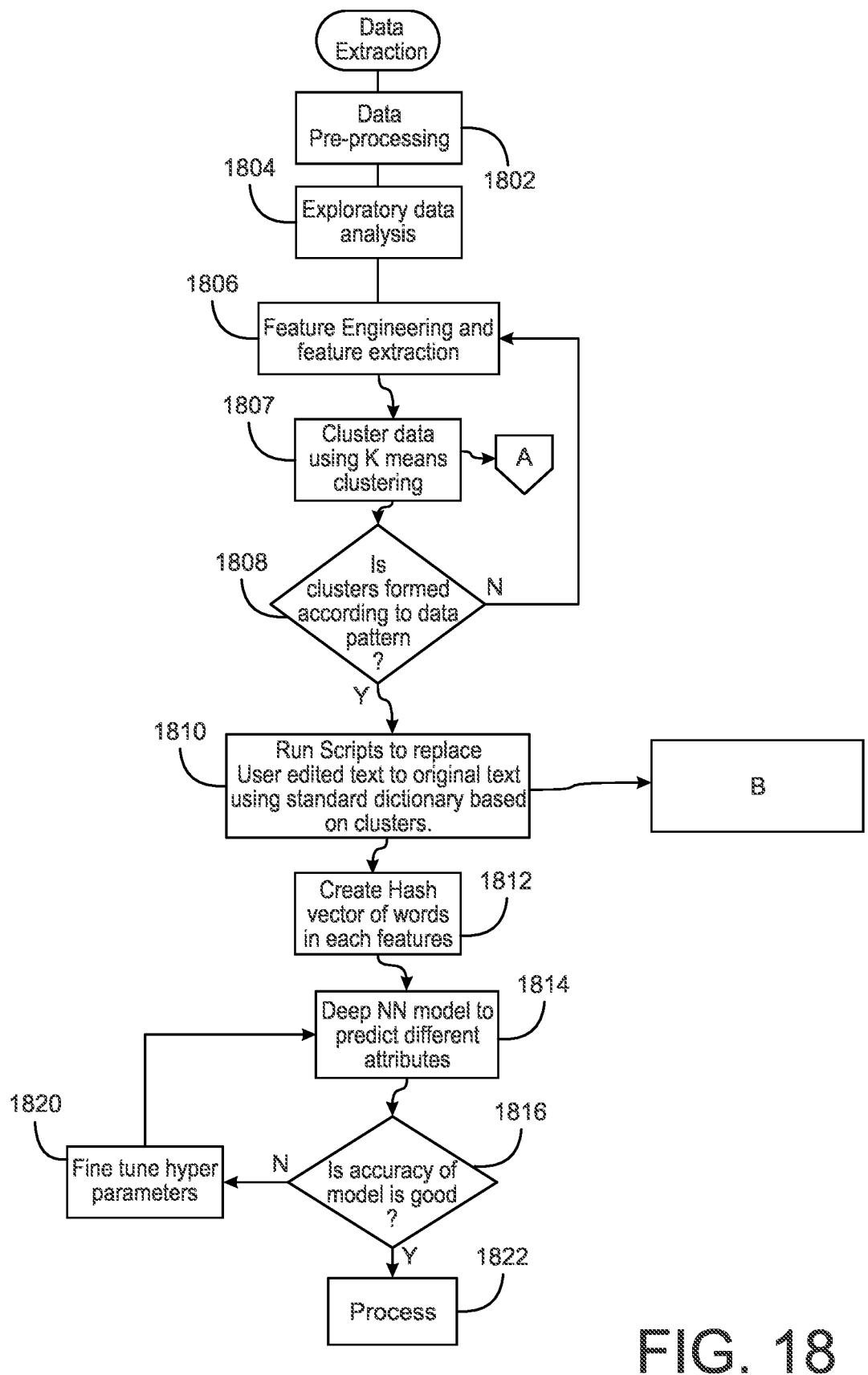
FIG. 18 illustrates another example series of steps for using a multicast service to configure a controlling device.

By way of further example and as shown in FIG. 18, once the data is collected from the IOT device, the data is preprocessed 1802, 1804. Considering the example of an mDNS signature, the mDNS signature contains a host name and a service name data field which are two major features for the subject ML models. As will be appreciated by those of skill in the art, both host names and service names usually indicate manufacturer brand and model/device type information. For example, in the signature {"ServiceNames": ["DENON:[AVR-1912]"], "HostNames":["DENON-AVR-1912.local"]}, the brand would be "DENON" and the model for the AV receiver would be "AVR-1912." Because the host name and service name are in text format, the data is preprocessed 1806 by being parsed to remove words, called tokenization. The extracted words are then encoded as integers or floating point values for use as input to the machine learning (NIL) algorithm, called feature extraction (or vectorization). As noted above, a hash vectorizer method may be used to convert a collection of text inputs to a matrix of token counts.

Figure 19:
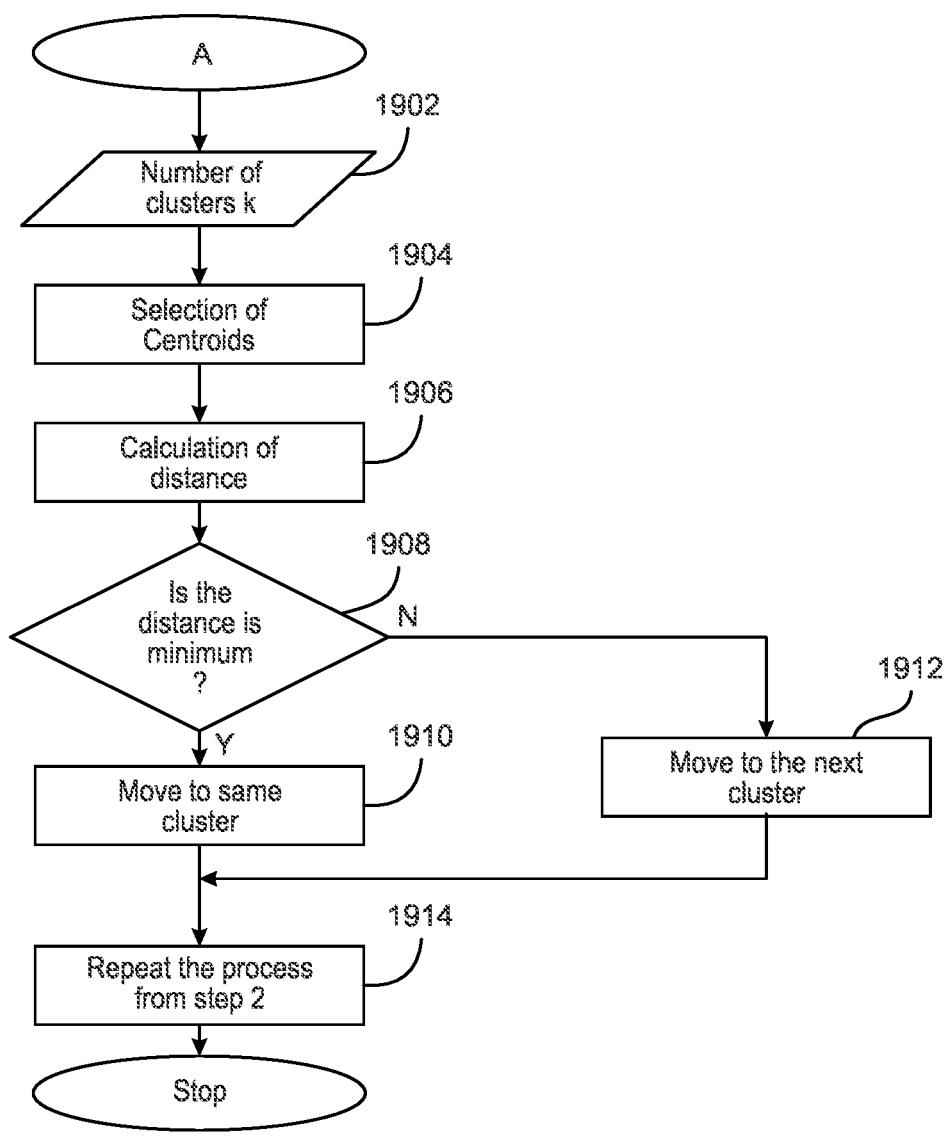
FIG. 19 illustrates an example series of steps for clustering data obtained while performing the steps illustrated in FIGS. 17 and 18.

Once feature extraction has been performed on the data with the data being encoded as per the above, an example K means clustering operation may be formed 1807/1808. As illustrated by way of example in FIG. 19, the data is clustered by first choosing 1902 a value of k, the number of clusters to be formed. The process then randomly selects k data points from the data set 1904 as the initial cluster centroids/centers and, for each data point, a distance between the data point and each cluster centroid is computed 1906 and the data point is assigned to the closest centroid 1908-1912. The process then continues by calculating for each cluster a new mean based on the data points in the cluster and the steps are repeated 1914 until the mean of the clusters stops changing or a maximum number of iterations is reached.

Figure 20:
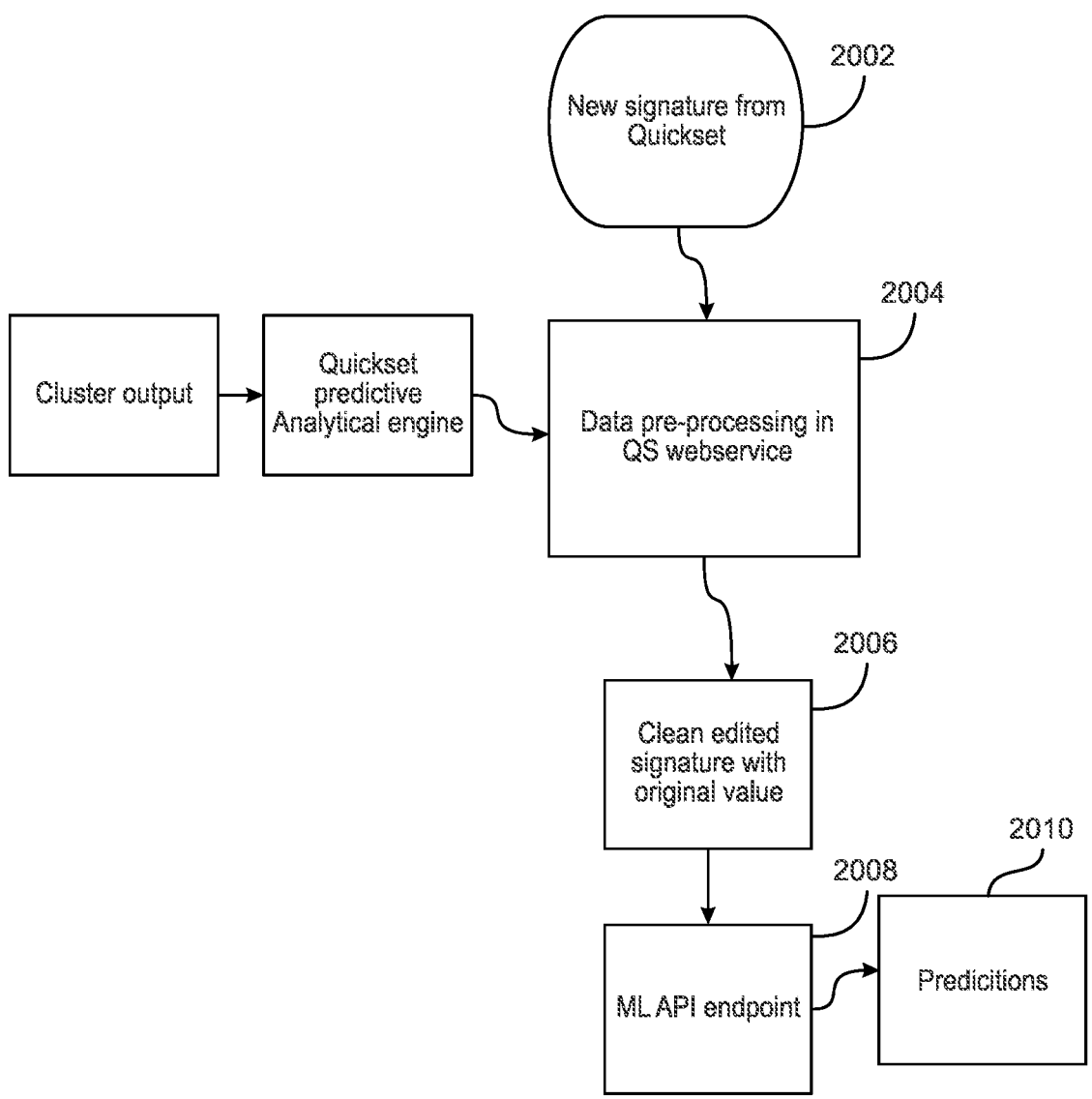
FIG. 20 illustrates an example series of steps for cleaning and replacing data obtained while performing steps illustrated in FIGS. 17 and 18.

Returning to FIG. 18, based on the clusters created and the data patterns present in each cluster, the user modified data in an obtained signature will be replaced 1810-1812 by the most occurring, original data in the same cluster, the band, model, etc. as desired. This process is additionally illustrated in FIG. 20 which shows a collected signature 2002 being pre-processed 2004, via use of clustering, to generate the cleaned signature 2006. The cleaned signature may then be used to configure a controlling device 100, to train ML models, to predict different attributes as desired, and the like 1814-1820 and 2008-2010.

In a preferred example of the system, at least the processing of the collected signature for the purpose of replacing user generated data within the signature with predicted, original data is performed locally. This will prevent the user generated data from leaving the home network and can address any privacy concerns a user may have with respect to their data.

In instances where data for use in replacing the user provided information cannot be predicted with a degree of certainty that is desired, the system may request that the user manually provide the desired, device identifying data. The data may be keyed into the system in a free form manner, spoken by the user and processed using NPL, selected from a drop-down menu, or the like without limitation. The user provided, appliance specifying data may then be substituted into the obtained signature and the now clean signature can be processed/used as descried above.

While various concepts have been described in detail, it will be appreciated by those skilled in the art that various modifications and alternatives to those concepts could be developed in light of the overall teachings of the disclosure. For example, in an alternate embodiment of controlling device functionality, in place of a preferred command matrix such as illustrated in FIG. 7, the programming of an example controlling device may utilize a command prioritization list, for example a prioritization list "IP, CEC, IR" may cause the controlling device programming to first determine if the requested command can be issued using Internet Protocol, only if not, then determine if the requested command can be issued using a CEC command over the HDMI interface, and only if not, then attempt to issue the requested command via an infrared signal. Such a prioritization reflects an example preference of using bi-directional communication protocols over uni-directional communication protocols over line of sight communication protocols, e.g., IR, when supported by the intended target appliance.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for configuring a controlling device to control a target appliance that supports a multicast communications protocol, the method comprising:
  receiving a signature comprised of a plurality of data blocks formatted in accordance with the multicast communications protocol from the target appliance;
  determining that a user has caused an originally provided vendor data in a one or more of the plurality of data blocks to be replaced with a user data;
  in response to it being determined that the user has caused the originally provided vendor data in the one or more of the plurality of data blocks to be replaced with the user data, providing a representation of at least a portion of signature to an analytics engine for processing whereby the user data within the one or more of the plurality of data blocks is replaced with a predicted version of the originally provided vendor data; and
  providing the predicted version of the originally provided vendor data to a controlling device configuration process, the controlling device configuration process functioning to provision the controlling device with a command code set for use in communicating commands to the target appliance.

2. The method as recited in claim 1, comprising using a discovery process to cause the signature to be received from the target appliance.

3. The method as recited in claim 1, wherein the predicted version of the originally provided vendor data comprises data indicative of a brand and model for the target appliance.

4. The method as recited in claim 1, wherein the user data comprises text data and the step of determining that the user has caused the originally provided vendor data in the one or more of the plurality of data blocks to be replaced with with the user data comprises parsing the signature to extract data from the one or more of the plurality of data blocks.

5. The method as recited in claim 1, further comprising the step of cleaning the at least a portion of the signature prior to providing the at least a portion of the signature to the analytics engine.

6. The method as recited in claim 1, wherein the multicast communications protocol comprises a multicast domain name service (mDNS) communications protocol.

7. The method as recited in claim 1, wherein the multicast communications protocol comprises a Simple Service Discovery Protocol (SSDP).

8. The method as recited in claim 1, wherein the analytics engine uses a built clustering model that clusters data based on matching features to predict the original data.

9. A controlling device configurable to control a target appliance that supports a multicast communications protocol, the controlling device comprising:
 a processing device;
 a first communications interface coupled to the processing device;
 a second communications interface coupled to the processing device; and
 a memory coupled to the processing device, the memory storing instructions which, when executed by the processing device, cause the controlling device to perform steps comprising:
 receiving a signature comprised of a plurality of data blocks formatted in accordance with the multicast communications protocol from the target appliance via the first communications interface;
 determining that a user has caused an originally provided vendor data in a one or more of the plurality of data blocks to be replaced with a user data;
 in response to it being determined that the user has caused the originally provided vendor data in the one or more of the plurality of data blocks to be replaced with the user data, providing a representation of at least a portion of signature to an analytics engine for processing whereby the user data within the one or more of the plurality of data blocks is replaced with a predicted version of the originally provided vendor data; and
 providing the predicted version of the originally provided vendor data to a controlling device configuration process, the controlling device configuration process functioning to use the predicted, original version of the originally provided vendor data to provision the controlling device with a command code set for use in communicating commands to the target appliance via use of at least the second communications interface.

10. The controlling device as recited in claim 9, wherein the instructions executable by the processing device cause the controlling device to process the at least a portion of the signature to cause the user data within the one or more of the plurality of data blocks to be replaced with the predicted, original version of the originally provided vendor data.

11. The controlling device as recited in claim 9, wherein the instructions executable by the processing device cause the controlling device to use the predicted version of the originally provided vendor data to provision the controlling device with the command code set for use in communicating commands to the target appliance via use of at least the second communications interface.

12. The controlling device as recited in claim 9, wherein the first communications interface comprises a radio frequency communications interface.

13. The controlling device as recited in claim 9, wherein the second communications interface comprises a wireless communications interface.

14. The controlling device as recited in claim 9, wherein the second communications interface comprises a wired communications interface.

15. The controlling device as recited in claim 9, wherein a discovery process causes the signature to be received from the target appliance.

16. The controlling device as recited in claim 9, wherein the predicted version of the originally provided vendor data comprises data indicative of a brand and model for the target appliance.

17. The controlling device as recited in claim 9, wherein the user data comprises text data and the step of determining that the user has caused the originally provided vendor data in the one or more of the plurality of data blocks to be replaced with the user data comprises parsing the signature to extract data from the one or more of the plurality of data blocks.

18. The controlling device as recited in claim 9, wherein the instructions cause the controlling device to clean the at least a portion of the signature prior to providing the at least a portion of the signature to the analytics engine.

19. The controlling device as recited in claim 9, wherein the multicast communications protocol comprises a multicast domain name service (mDNS) communications protocol.

20. The controlling device as recited in claim 9, wherein the multicast communications protocol comprises a Simple Service Discovery Protocol (SSDP).

* * * * *